United States Patent [19]
Szymanski et al.

[11] Patent Number: 6,016,211
[45] Date of Patent: Jan. 18, 2000

[54] OPTOELECTRONIC SMART PIXEL ARRAY FOR A RECONFIGURABLE INTELLIGENT OPTICAL INTERCONNECT

[76] Inventors: Ted Szymanski, 3600 Av. du Parc, #1011, Montreal, Canada, H2X 3R2; Harvard Scott Hinton, 1606 Alpine, Longmont, Colo. 80501

[21] Appl. No.: 08/491,633

[22] Filed: Jun. 19, 1995

[51] Int. Cl.[7] .............................. H04J 14/00; G06E 1/04
[52] U.S. Cl. .......................... 359/117; 359/108; 359/163; 364/713
[58] Field of Search .................................. 359/117, 128, 359/139, 163, 107–108; 364/713; 385/14, 16

[56] References Cited

U.S. PATENT DOCUMENTS

| | | | |
|---|---|---|---|
| 5,122,691 | 6/1992 | Balakrishnan | 307/475 |
| 5,289,303 | 2/1994 | Cloonan et al. | 359/139 |
| 5,535,036 | 7/1996 | Gorant | 359/163 |

OTHER PUBLICATIONS

Cray Research Inc, "Cray T3D System Architecture Overview," Sep. 23, 1993 (pp. 9, 10, 11).
Hamanaka, "Optical Bus Interconnection Using Selfoc Lenses", Optics Letters, Aug. 1991, (p. 2).
OM & Kostuk, "Comparison of the Performance Characteristics of Futurebust with an Optical Backplane", Int. Conf. Optical Computing, 1995, (p. 3).
Moresco, "Electronic System Packaging: The Search for Manufacturing . . . ", IEEE Trans. C.H.MT., Sep. 1990 (pp. 494, 495, 496).
Tummala & Rymaszewski, "Microelectronics Packaging Handbook", Reinmold, 1989, (pp. 43, 408–410, 532–535, & 784).
Redmon & Schenfeld, "A Distributed Reconfigurable Free–Space Interconnection Network . . . ", Proc. Optical Computing, 1994, (pp. 241–242).
Redmond & Schenfeld, "Experimental Results of a 64 Channel Free–Space Optical Interconnection Network." Proc. Optical Computing, Aug. 1994, (pp. 373–374).
Patterson & Hennessy, "Computer Architecture . . . ", Morgan–Kaufmann, 1995 (p. 658, Fig. 8.7, p. 660).
D'Asaro et. al, "Batch Fabrication & Operation . . . ", IEEE QE, Feb. 1993 (p. 670).
Camperi–Ginestet et al., "Integration of INP–Based . . . ", Proc. Optical Computing, Mar. 1995 (p. 145).
Goosen et. al., "GaAS MQW Modulators . . . ", IEEE Phot. Tech. Letters, Apr. 1995 (p. 360).
Hwang, "Advanced Computer Architecture . . . ", McGraw–Hill, 1993. (pp. 461, 468).
Matsuo et al, "Photonic Switch Monolithically Integrating . . . ", LEOS 94 Post Deadline Paper, Oct. 31, 1994 (pp. PD2.1–2.2).
Tamaru, "The Trend of Functional Memory Dev.", IEICF Trans. Elec., Nov. 1993 (pp. 1545, 1546 Fig. 1).
Novotny, "Parauet Optical Data Links Using UCSELS", Proc. SPIE, 1994 (pp. 140 & 141, Fig. 2).
Li et. al, "Applications of Fiber Image Guides to Bit–Parallel Optical Interconnections", Proc. Optical Computing, Mar. 1995 (pp. 286, 287, 288).

*Primary Examiner*—Kinfe-Michael Negash

[57] ABSTRACT

A packaged smart pixel array for a reconfigurable intelligent optical interconnect is described. The smart pixel array (298) comprises an optical-to-electronic optical I/O channel 68 input means, an electronic-to-optical optical I/O channel 68 output means, an electrical channel input means (134), an electrical channel output means (114), a data switching means (110) for switching data from optical channel input means to electrical channel output means, a data switching means (130) for switching data from electrical channel input means and optical channel input means to optical channel output means and a packaging means (300) which packages all these means onto a single package with identifiable input and output port means. The smart pixel array makes possible the realization of a reconfigurable optical interconnect which implements multiple reconfigurable optical communication channels.

35 Claims, 32 Drawing Sheets

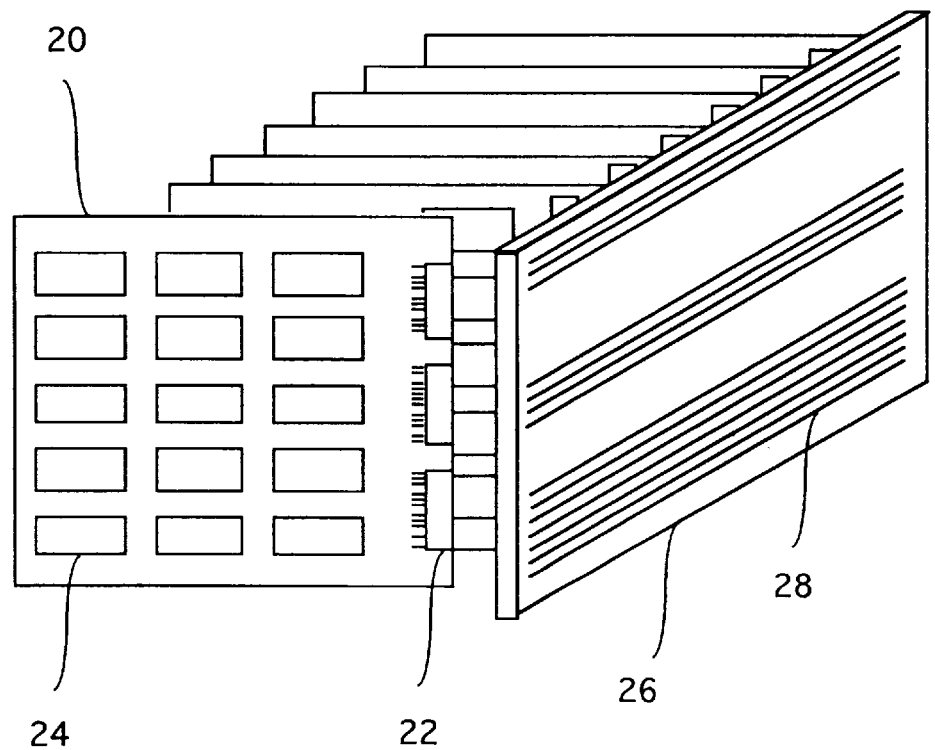
Fig. 1. Passive electrical bus backplane (prior art).

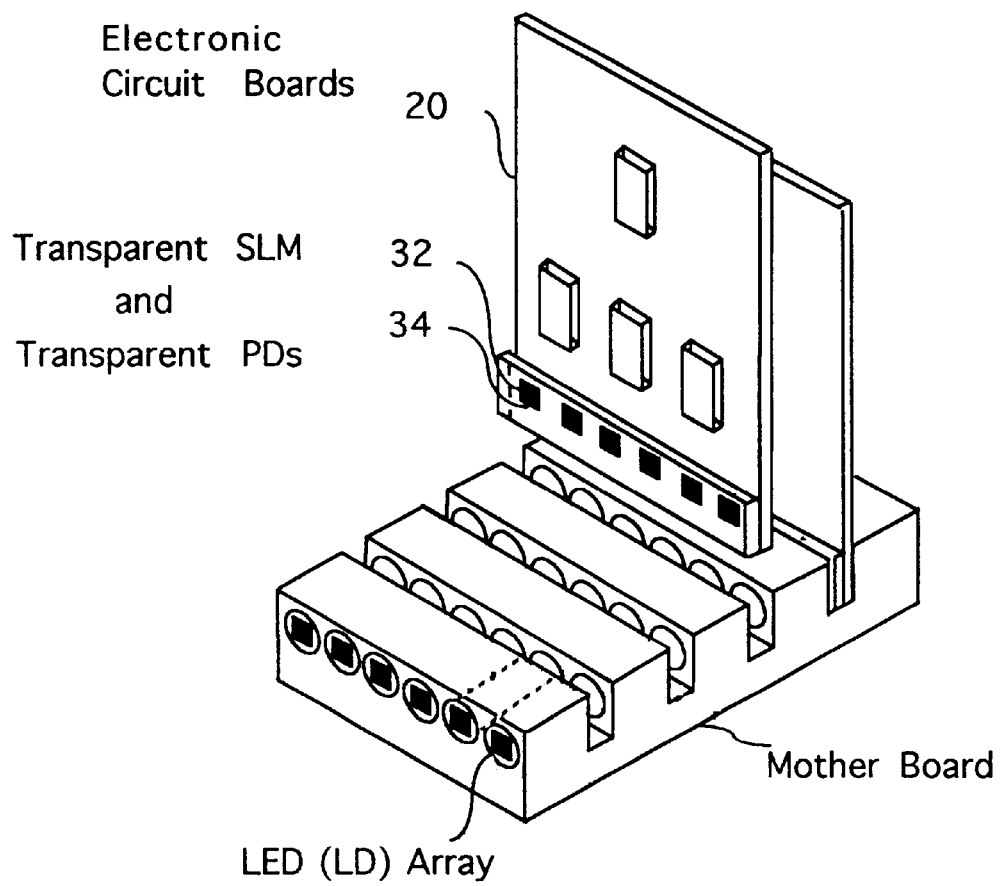
Fig. 2. Passive optical bus backplane (prior art).

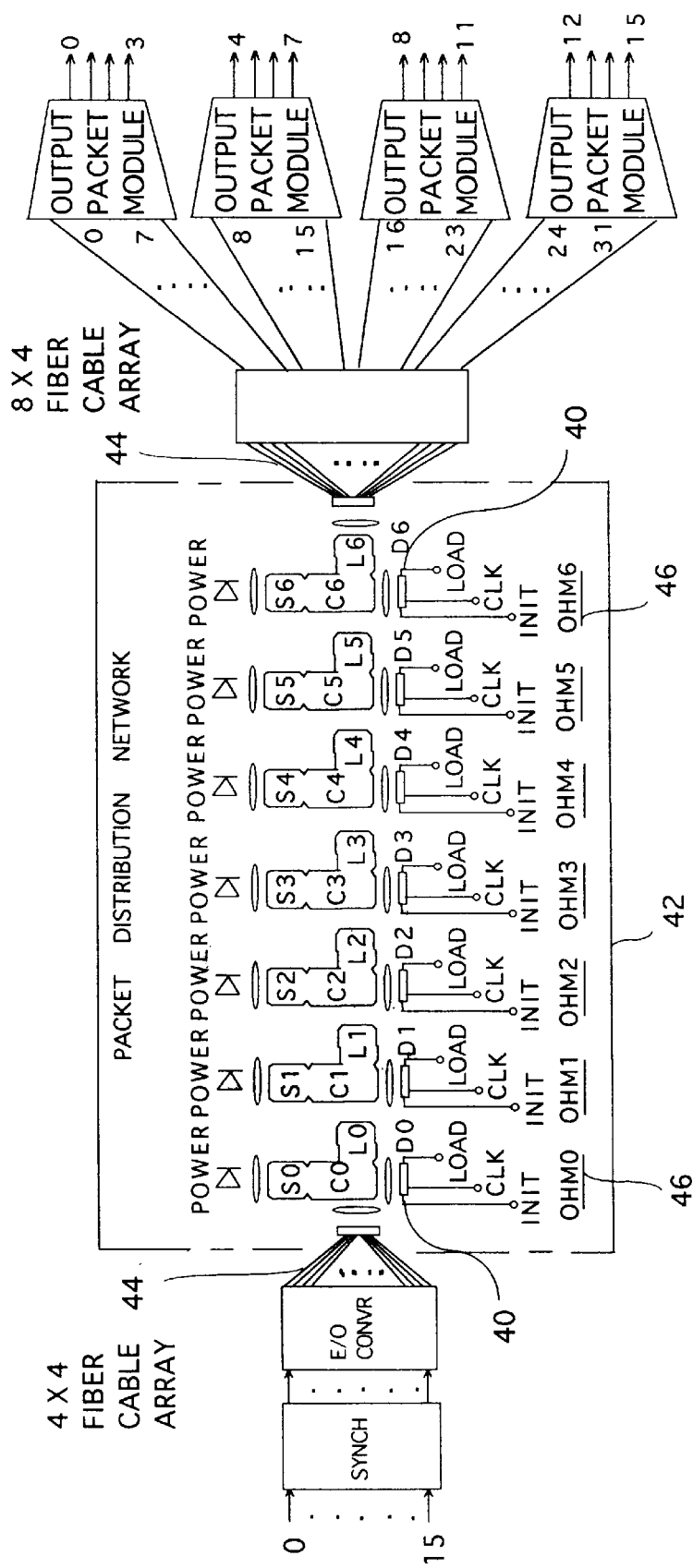
Fig. 3. Optical packet switch (prior art).

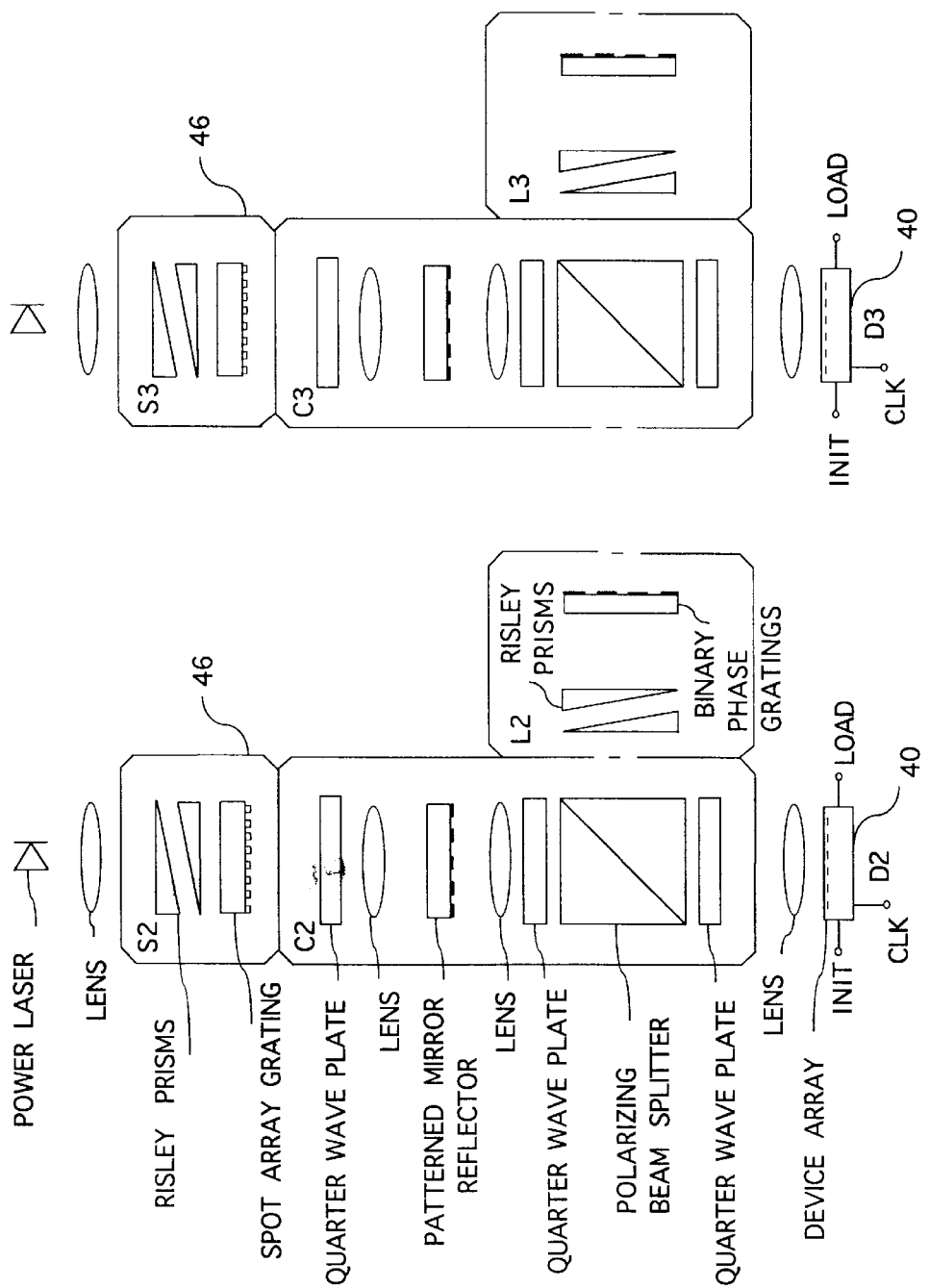
Fig. 4. Hardware for optically interconnecting two opto-electronic devices (prior art).

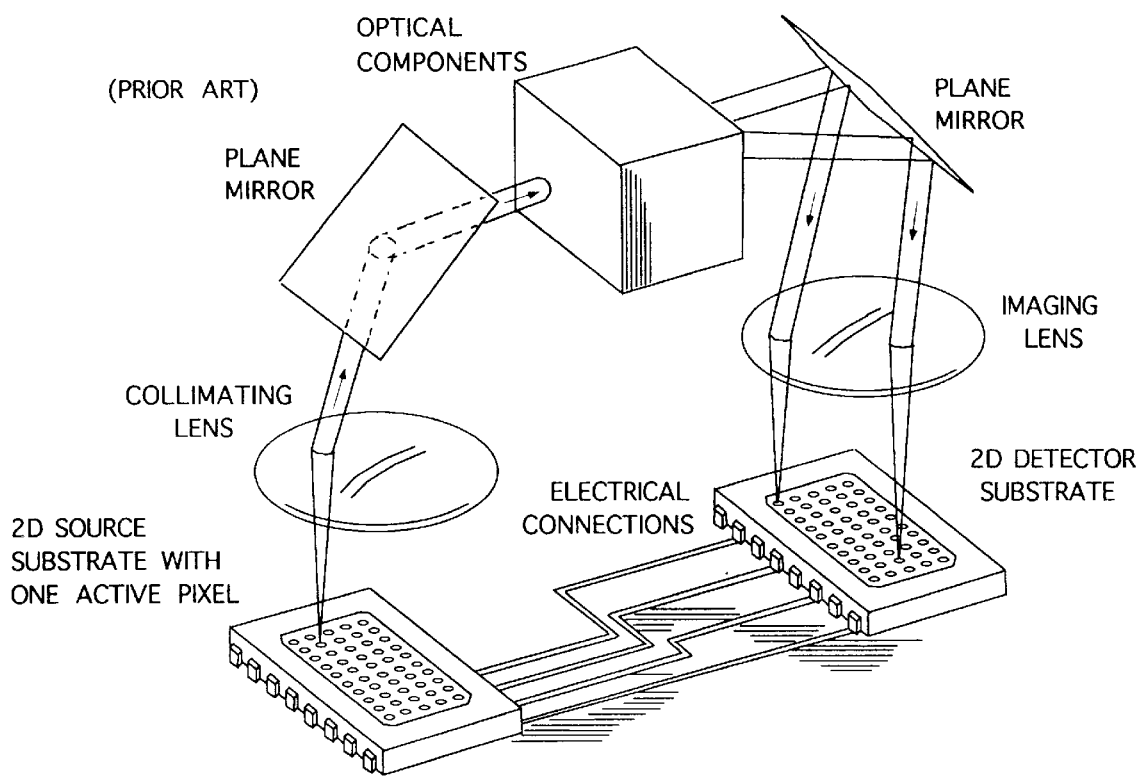
Fig. 5. Hardware for optically interconnecting two opto-electronic devices (prior art).

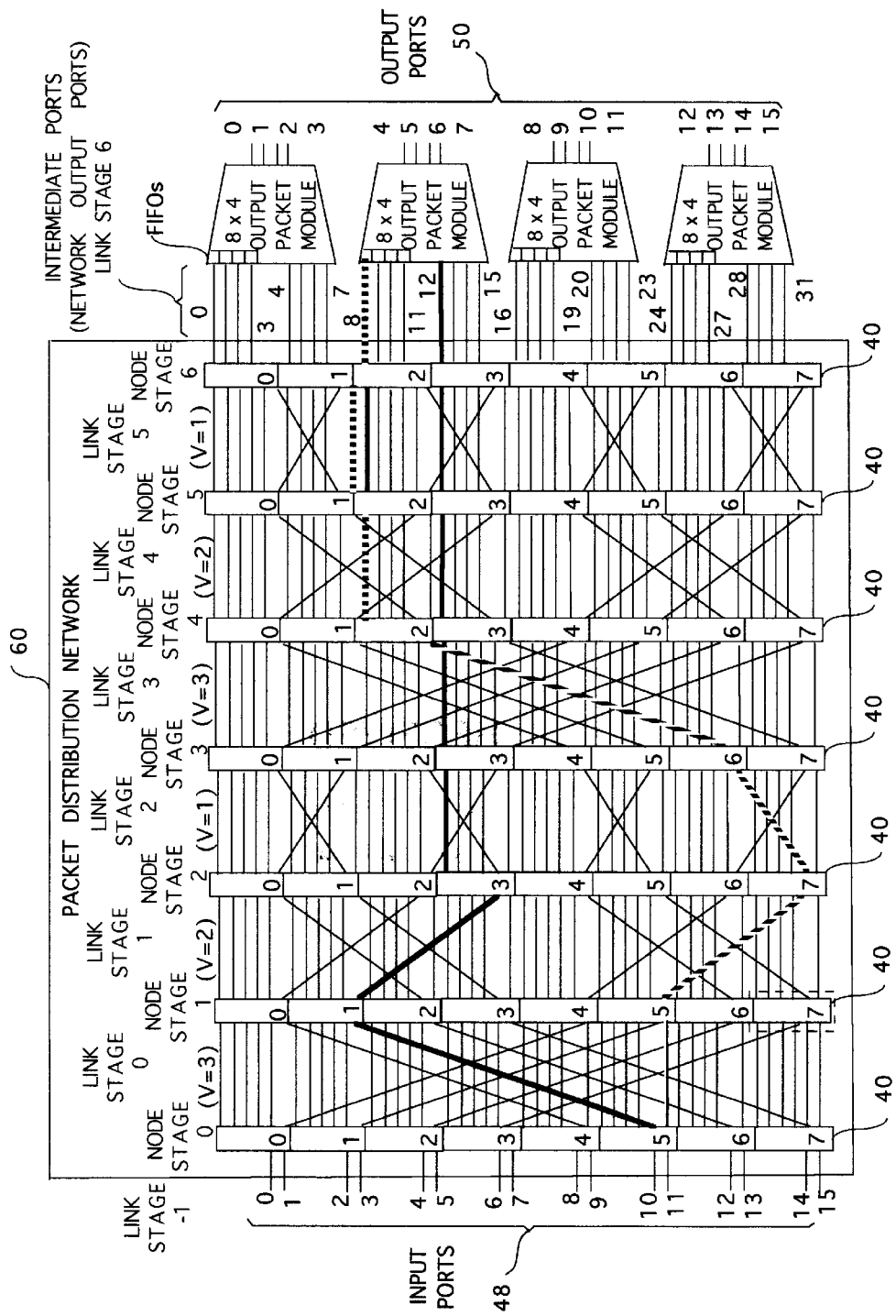
Fig. 6. Optical packet switching architecture (prior art).

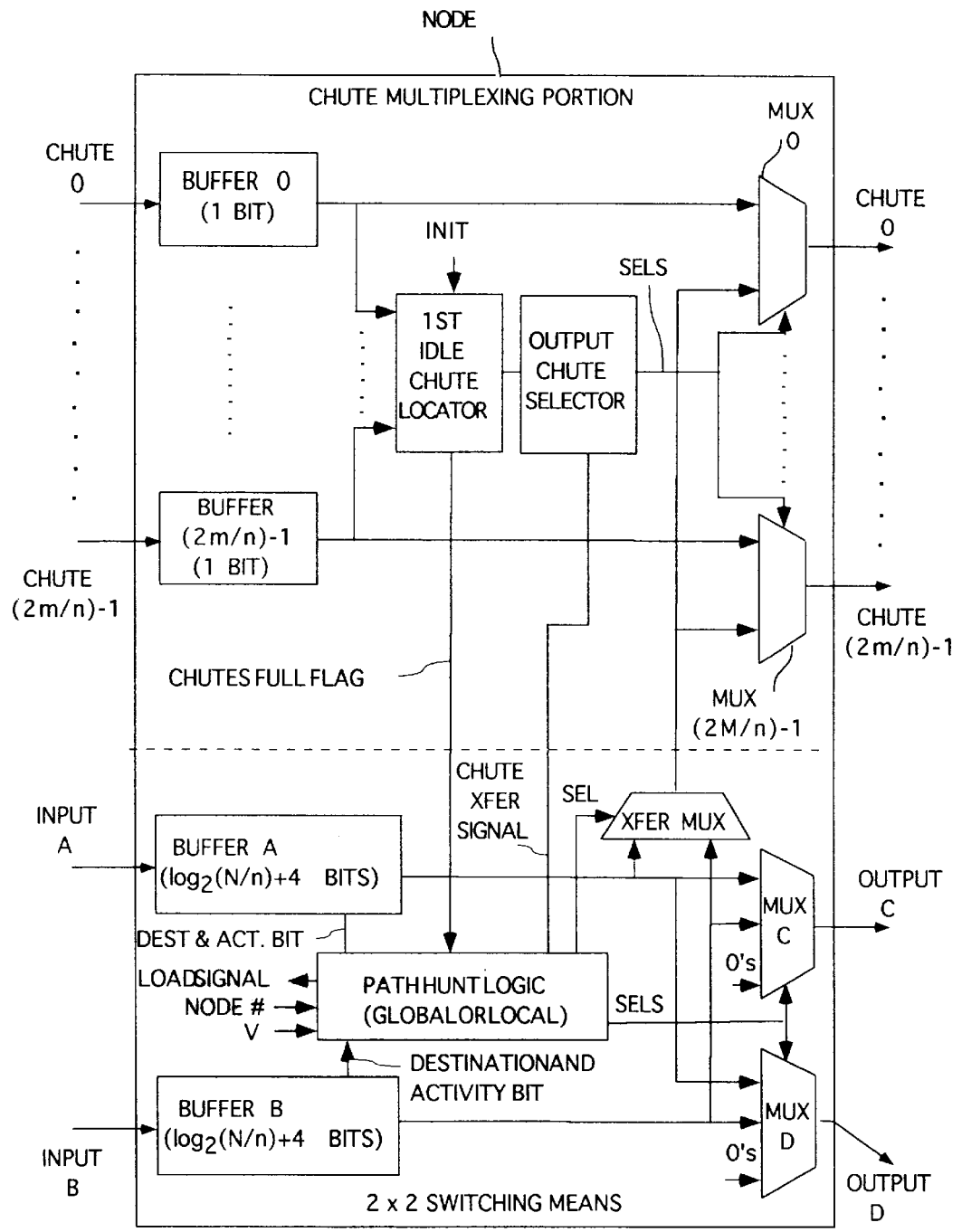
Fig. 7. Structure of an optoelectronic node (prior art).

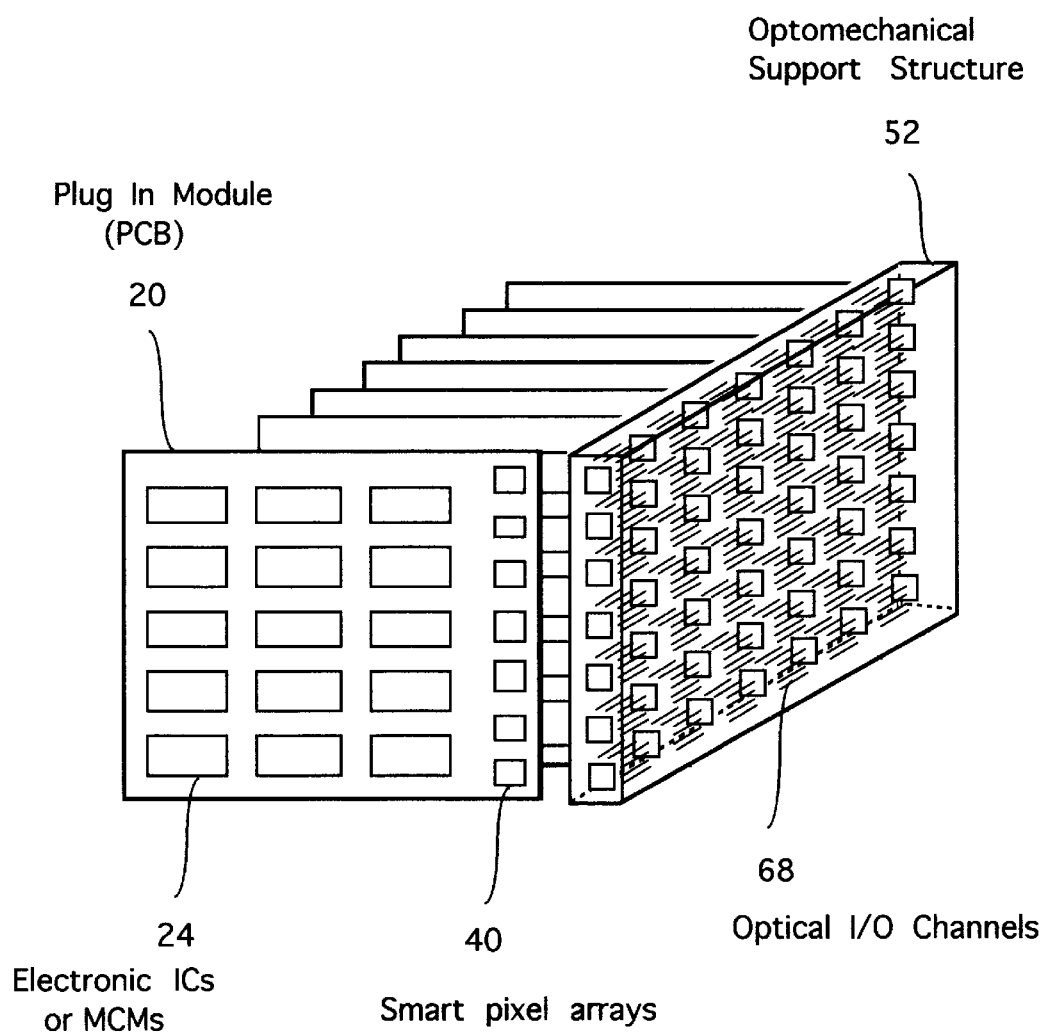
Fig. 8. Optical backplane with smart pixel arrays on plug-in modules.

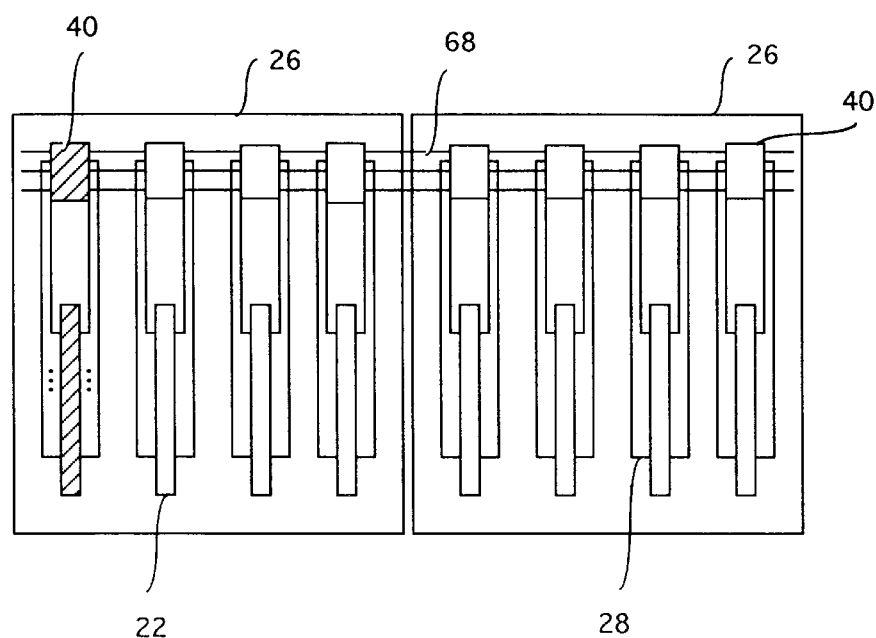
Fig. 9. Optical backplane with smart pixel arrays on multiple backplane PCBs.

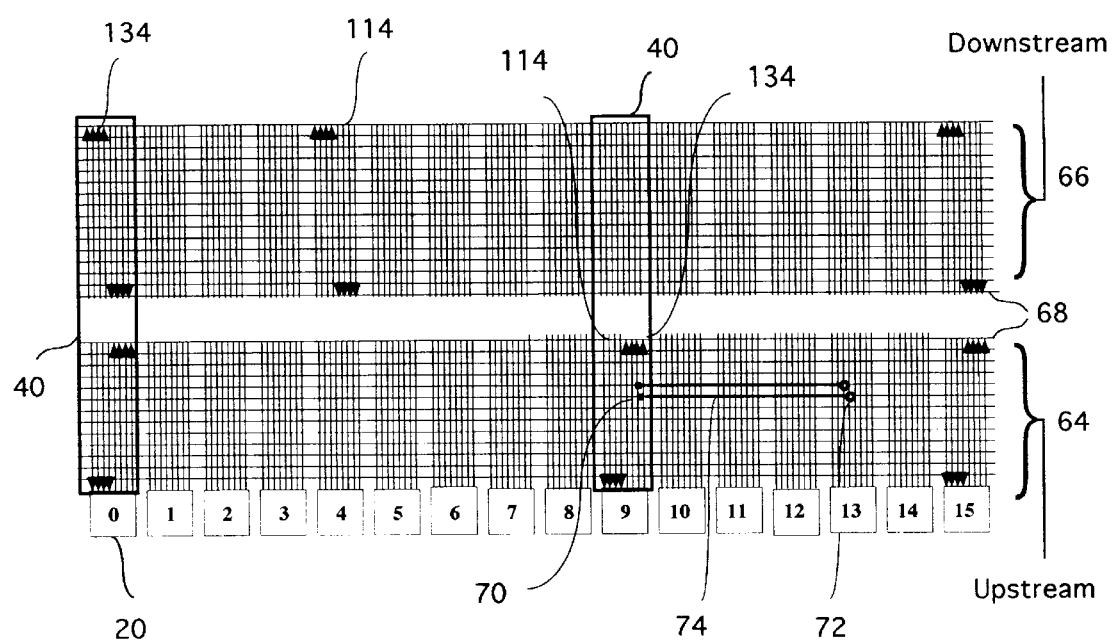
Fig. 10. Connectivity model for reconfigurable intelligent optical backplane.

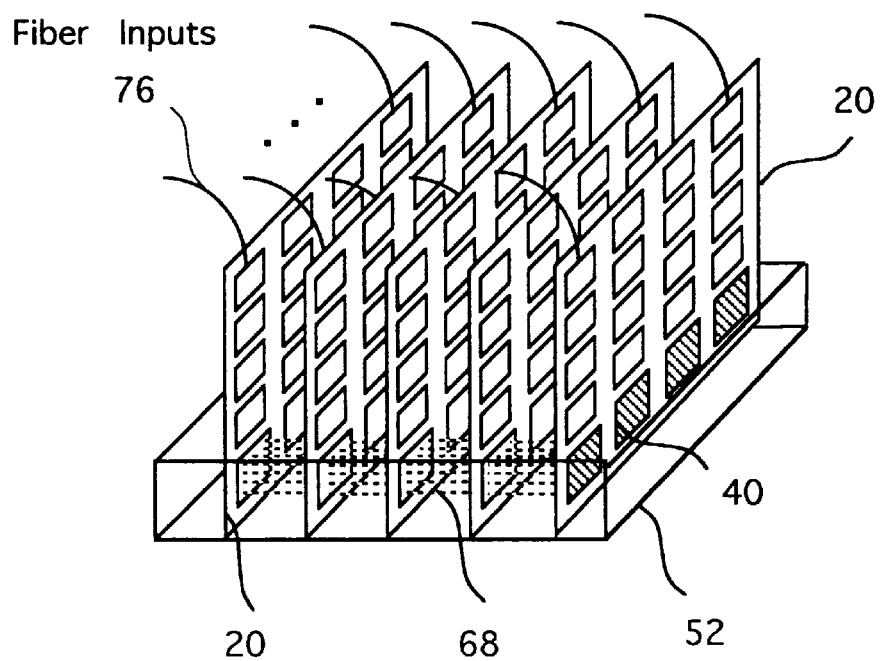
Fig. 11. Packet switch based on reconfigurable intelligent optical backplane.

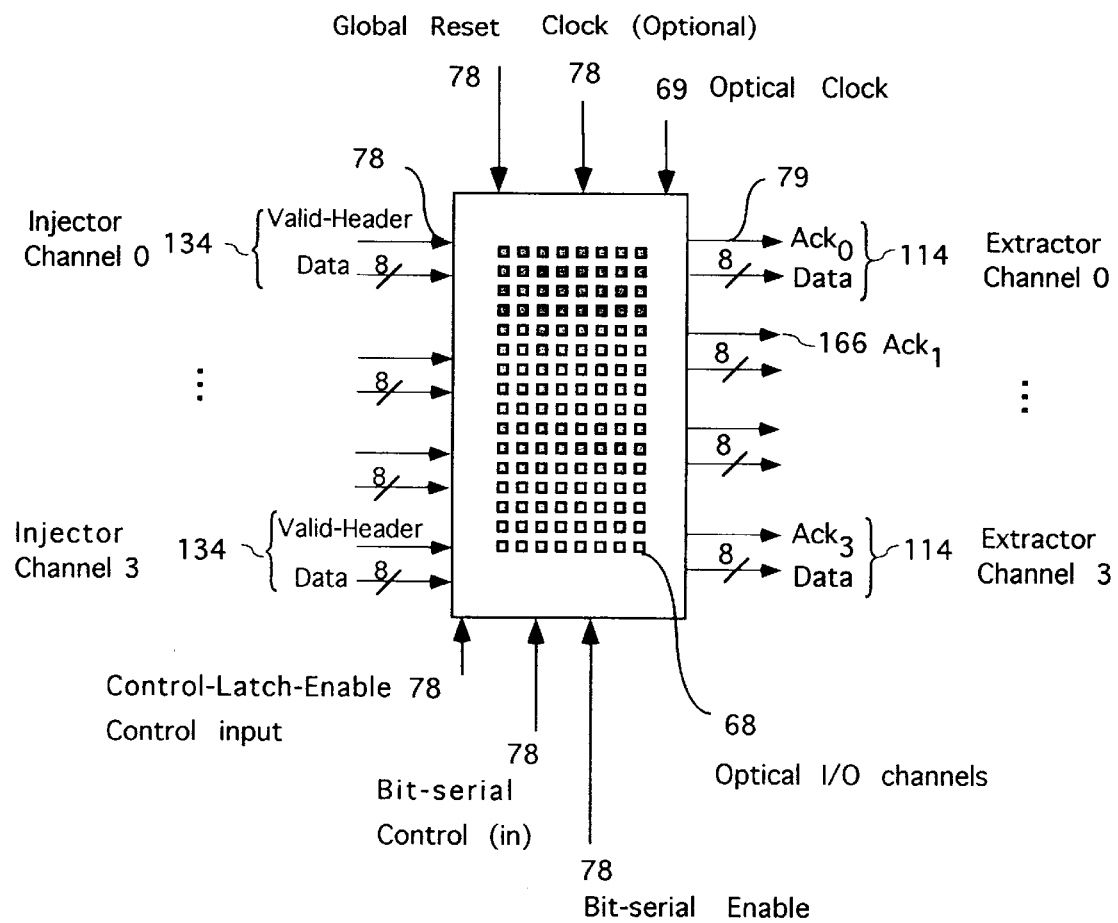
Fig. 12. Typical IO specification of a smart pixel array for a reconfigurable intelligent optical backplane.

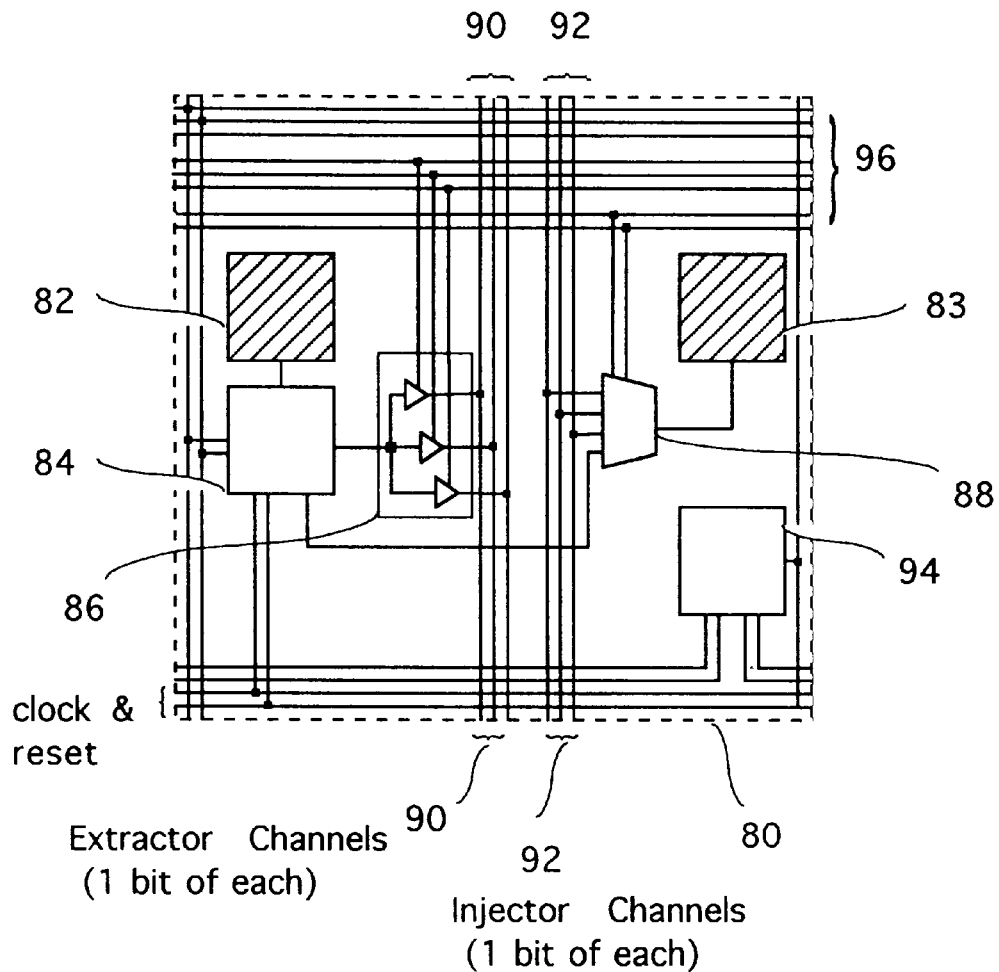
Fig. 13. Structure of a basic Smart Pixel.

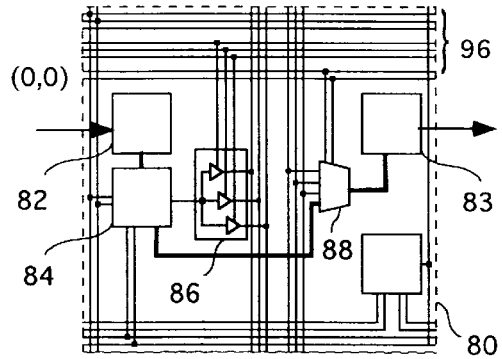
Fig. 14a. Transparent State
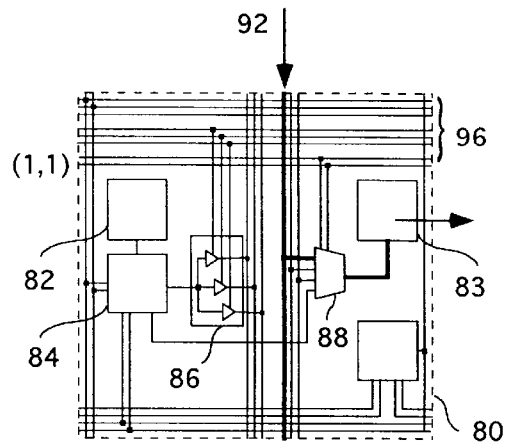
Fig. 14b. Transmitting State
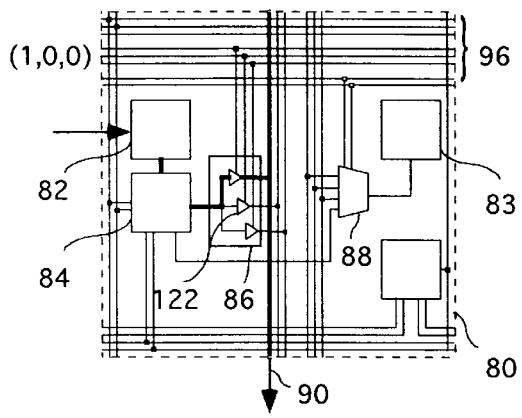
Fig. 14c Receiving State
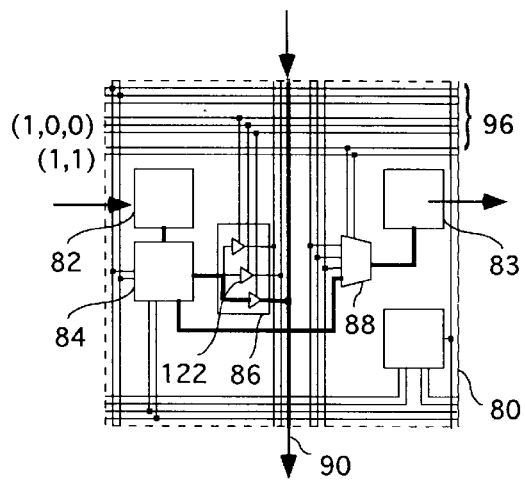
Fig. 14d. Receiving-and-Transmitting State
Fig. 14. Four basic states of a Smart Pixel. Active datapaths shown in bold.

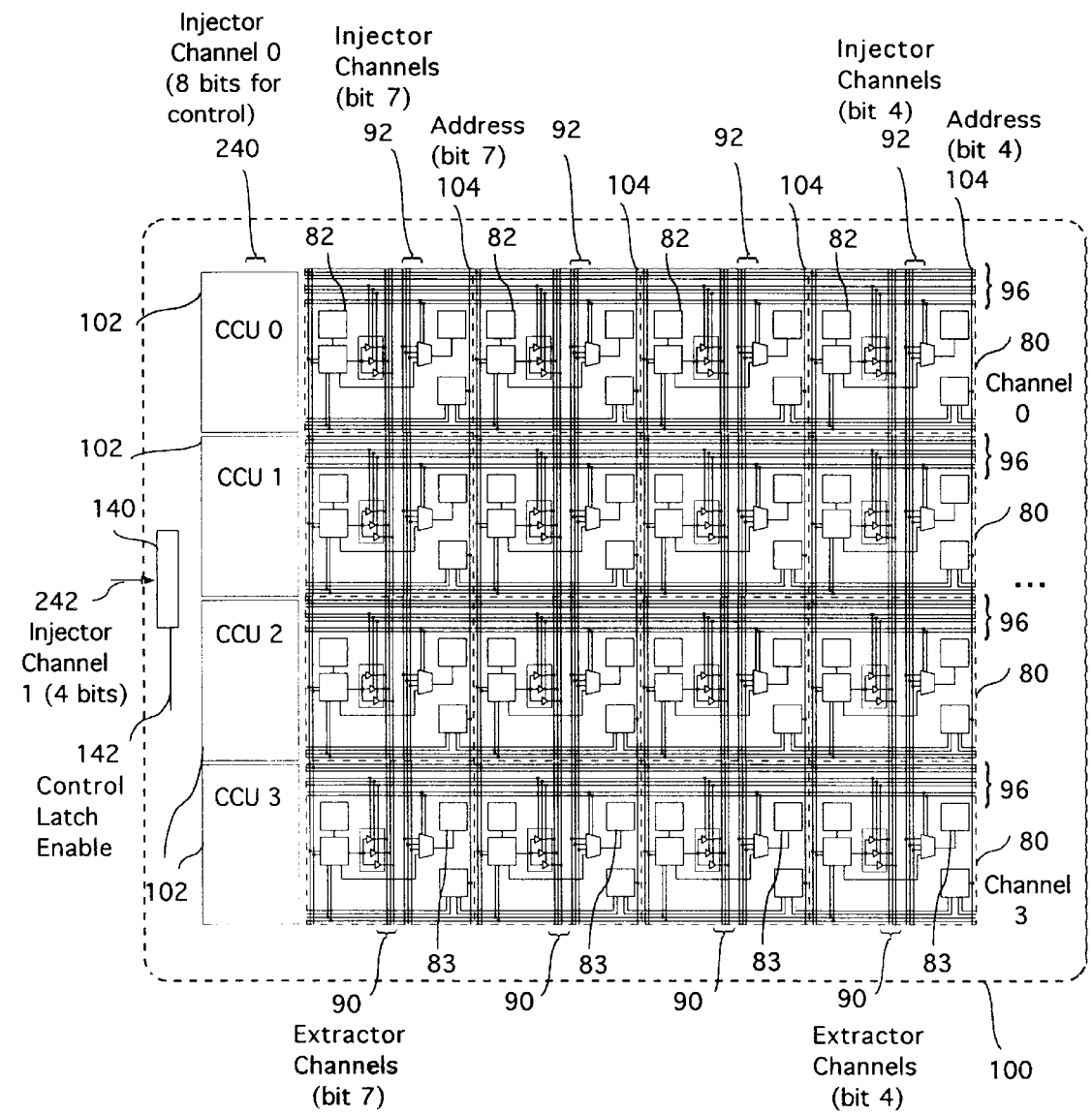
Fig. 15. 2D slice of pixels.

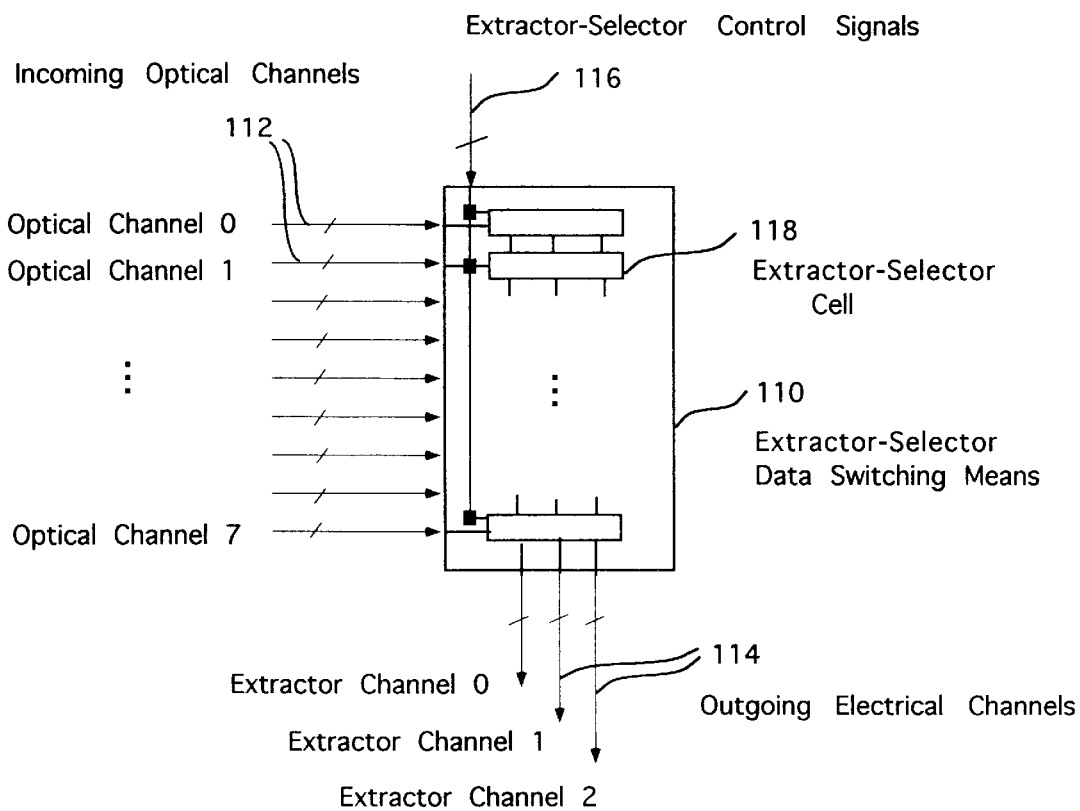
Fig. 16. Extractor selector circuit and one possible implementation based on multiple extractor selector cells.

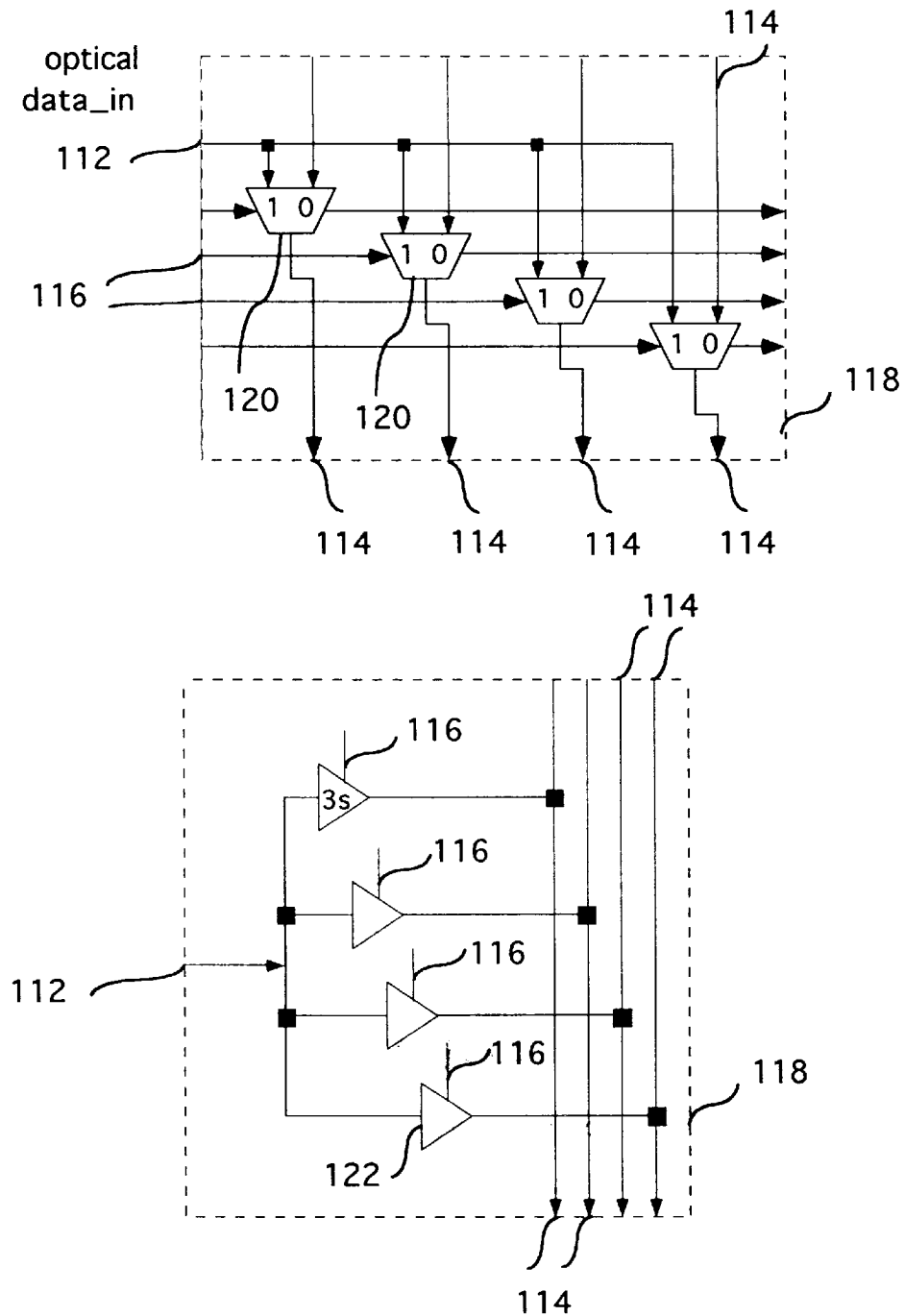
Fig. 17. Structures for extractor selector cells for realizing extractor-selector circuit.

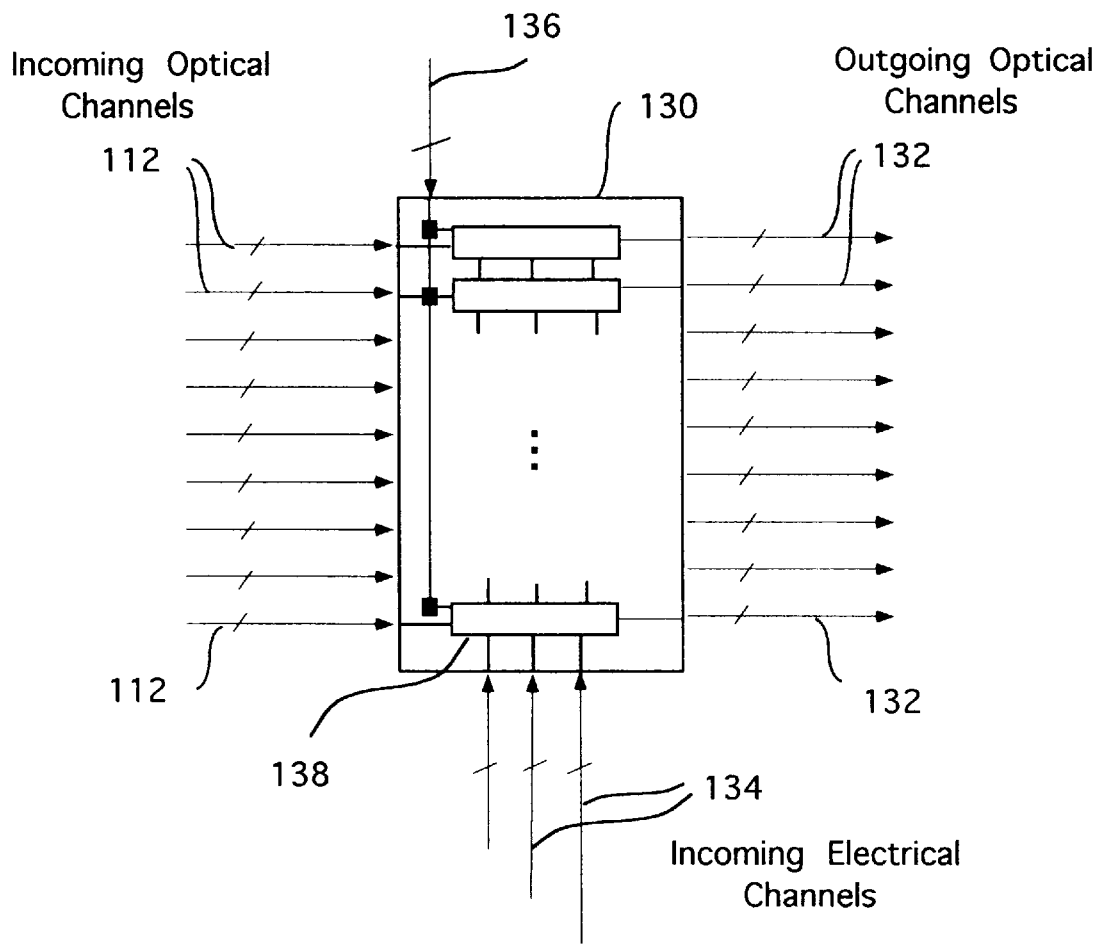
Fig. 18. Injector selector circuit and one implementation based on multiple injector-selector cells (multiplexers).

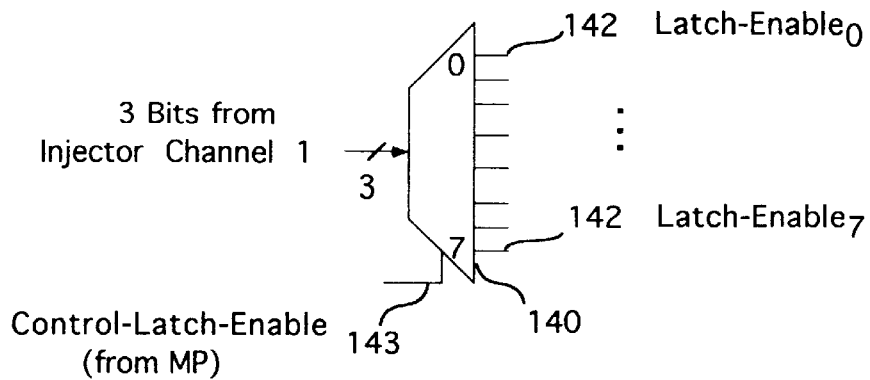
Fig. 19. Decoder for writing control bits to Control-latches.
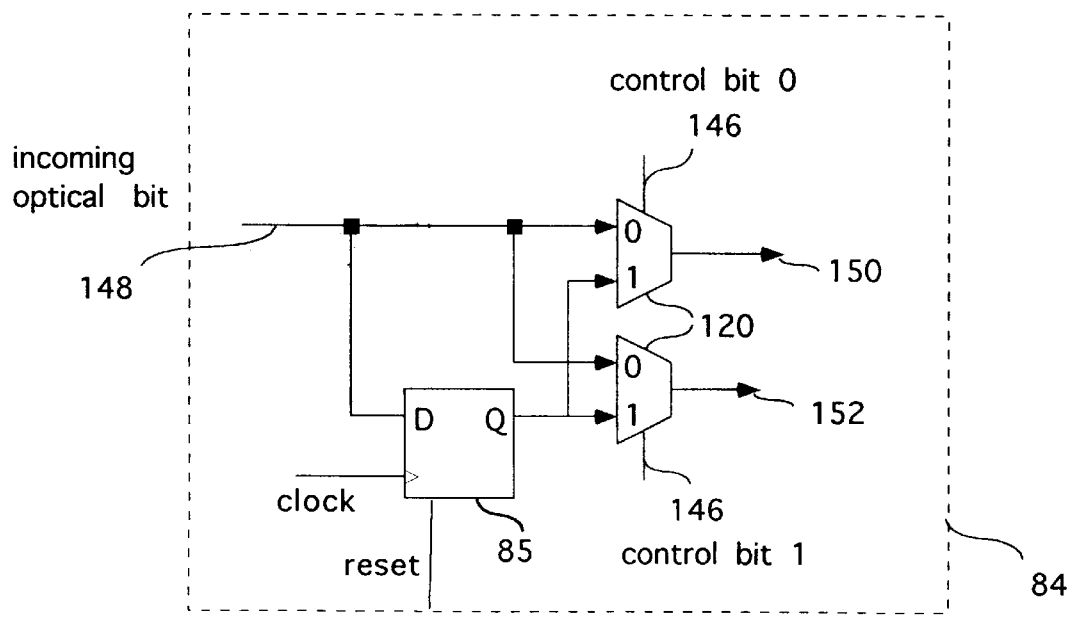
Fig. 20. Structure of programmable delay circuit.

Fig. 21. Channel Control Units.

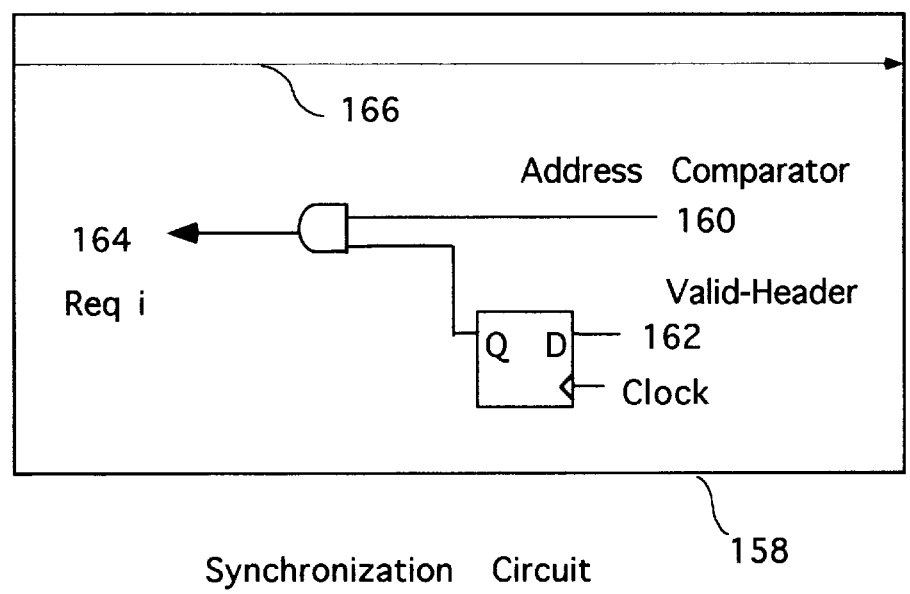
Fig. 22. Typical structure of the synchronizer circuit.

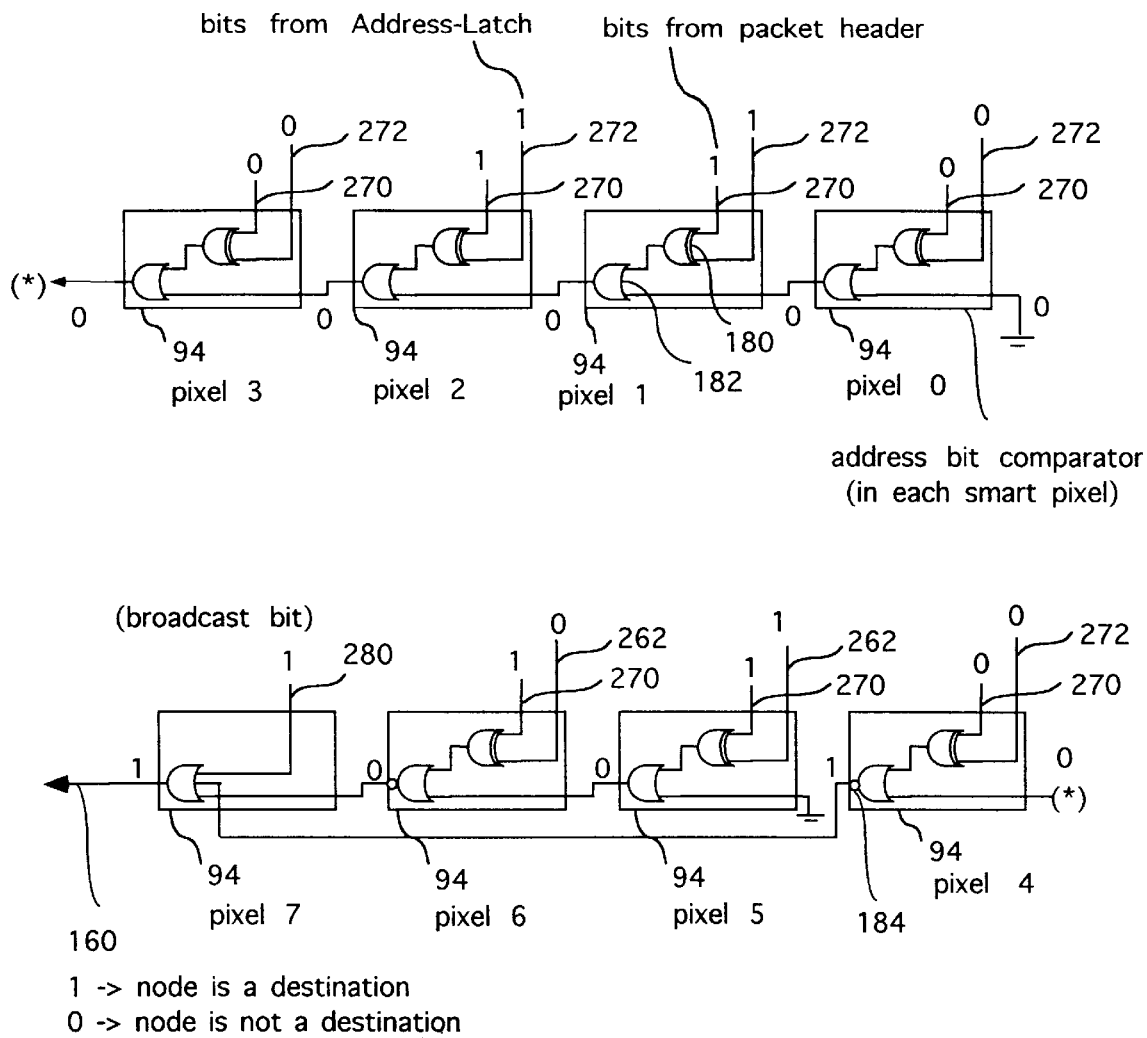
Fig. 23. Typical packet header processing for determining data to extract.

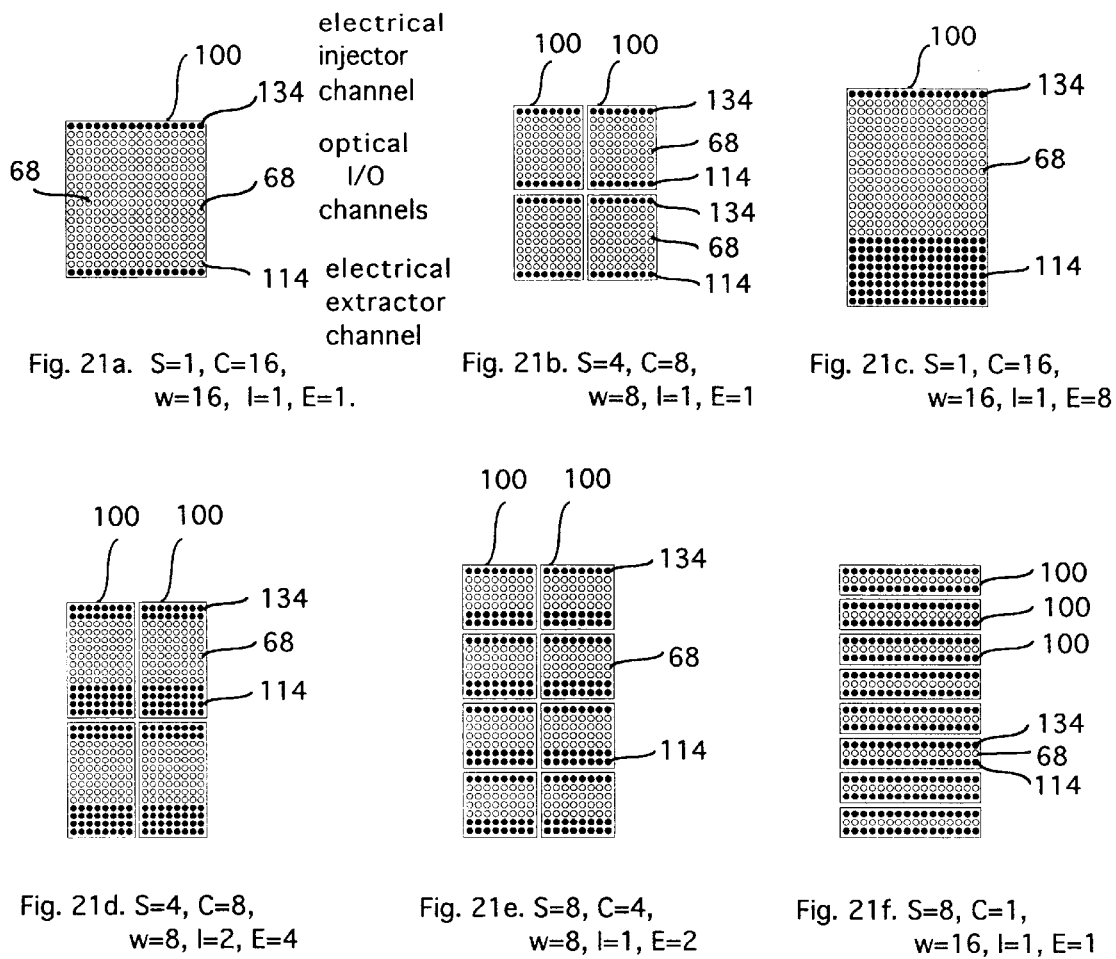
Fig. 24. Smart pixel organizations with varying ratios of electrical to optical bandwidth.

Figure 25: Various physical layer topologies of optical backplane.

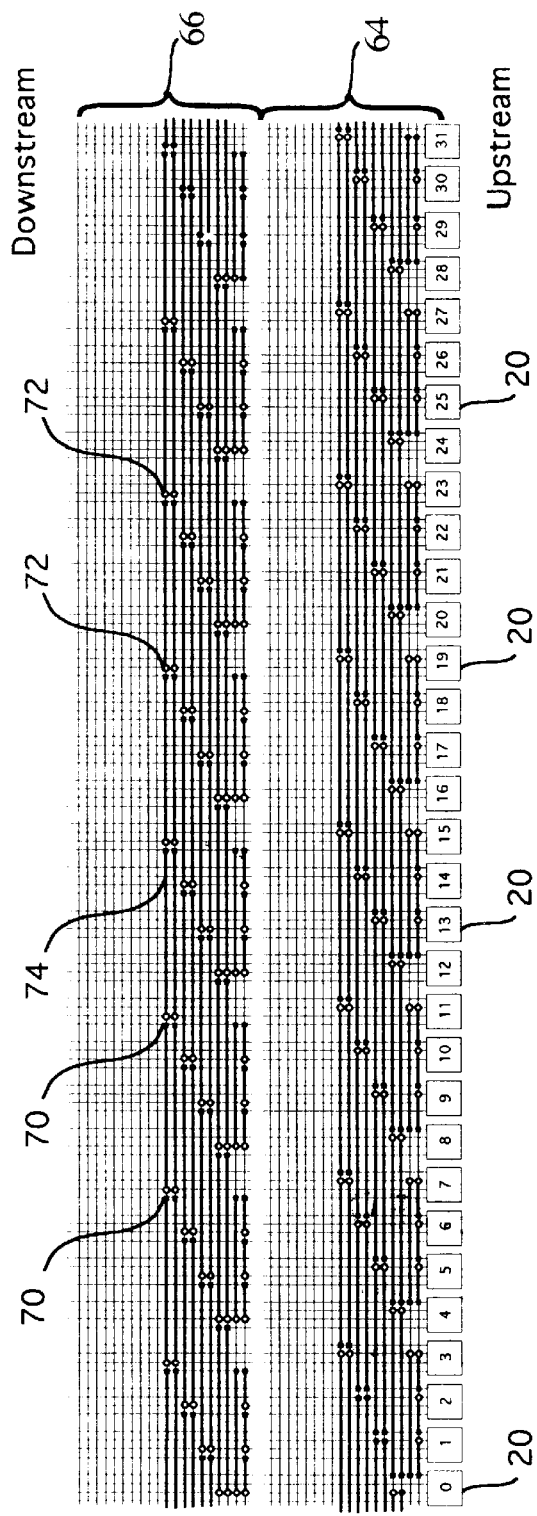
Fig. 26. Embedding of 512 Processor Cray T3D Supercomputer onto a Circular HyperPlane with 32 PCBs.

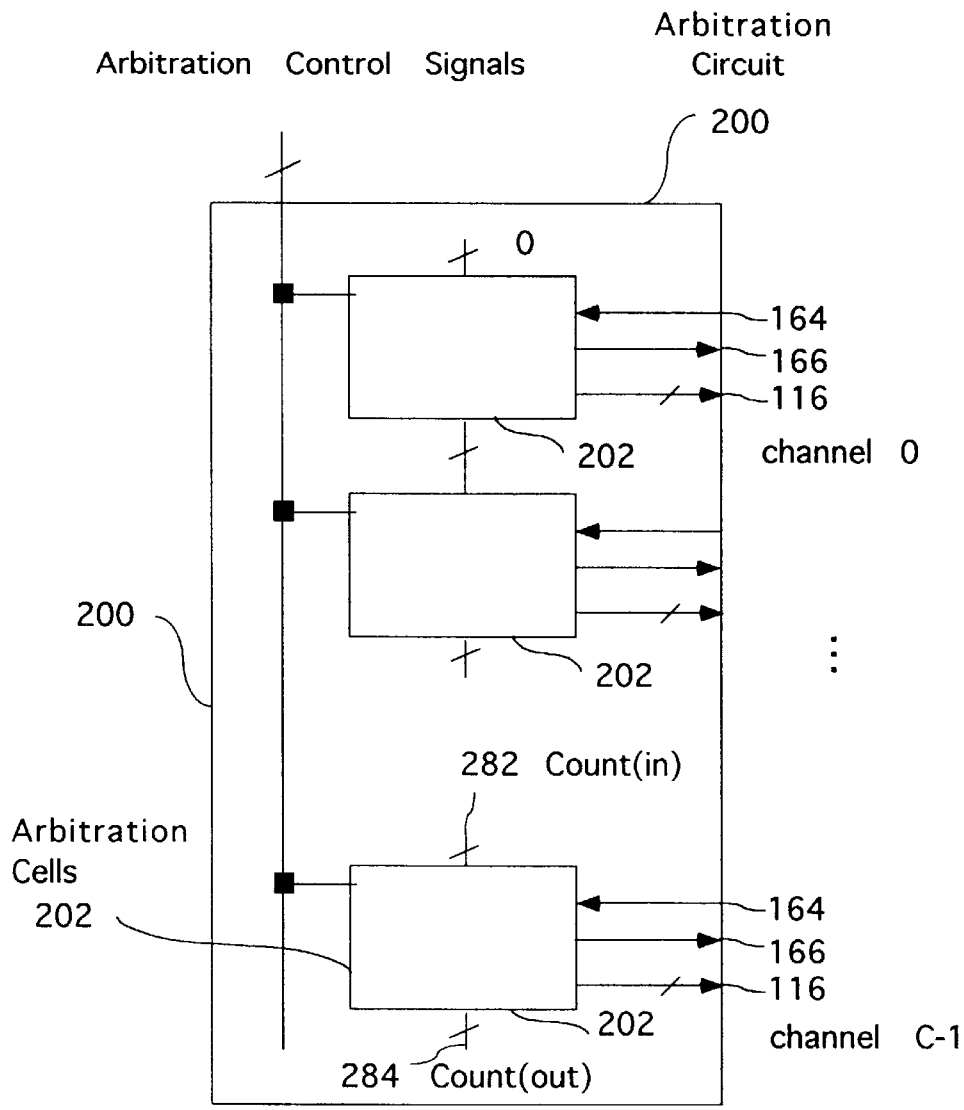
Fig. 27. Arbitration circuit for a slice and one possible implementation based on multiple arbitration cells.

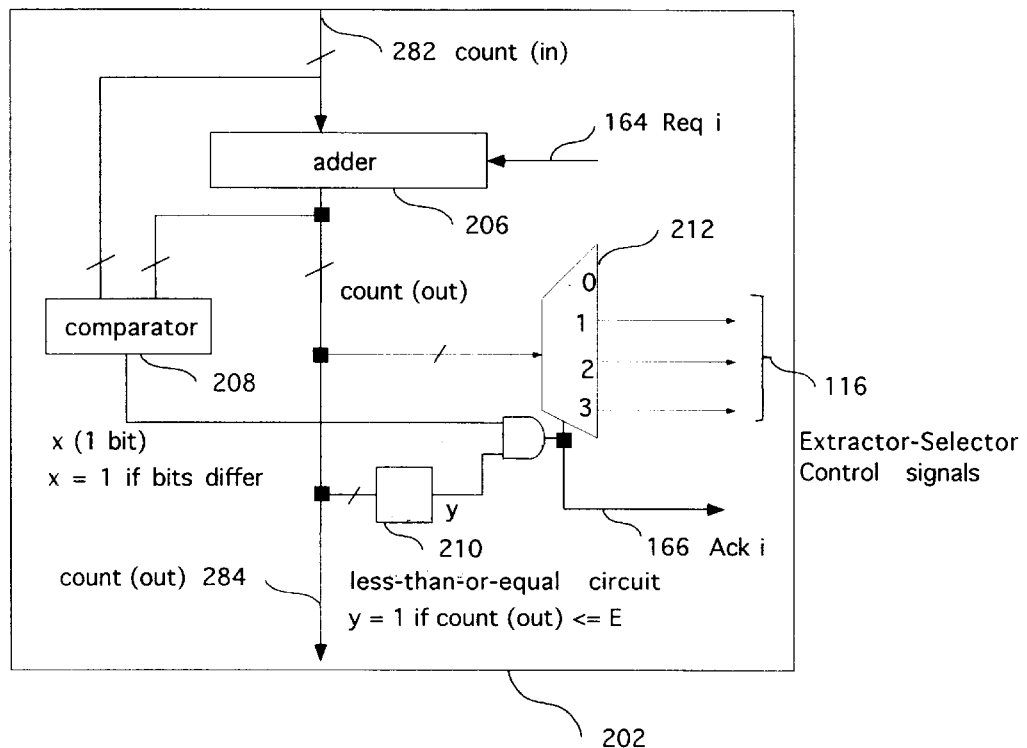
Fig. 28: Typical structure of an arbitration cell for realizing Arbitration circuit.

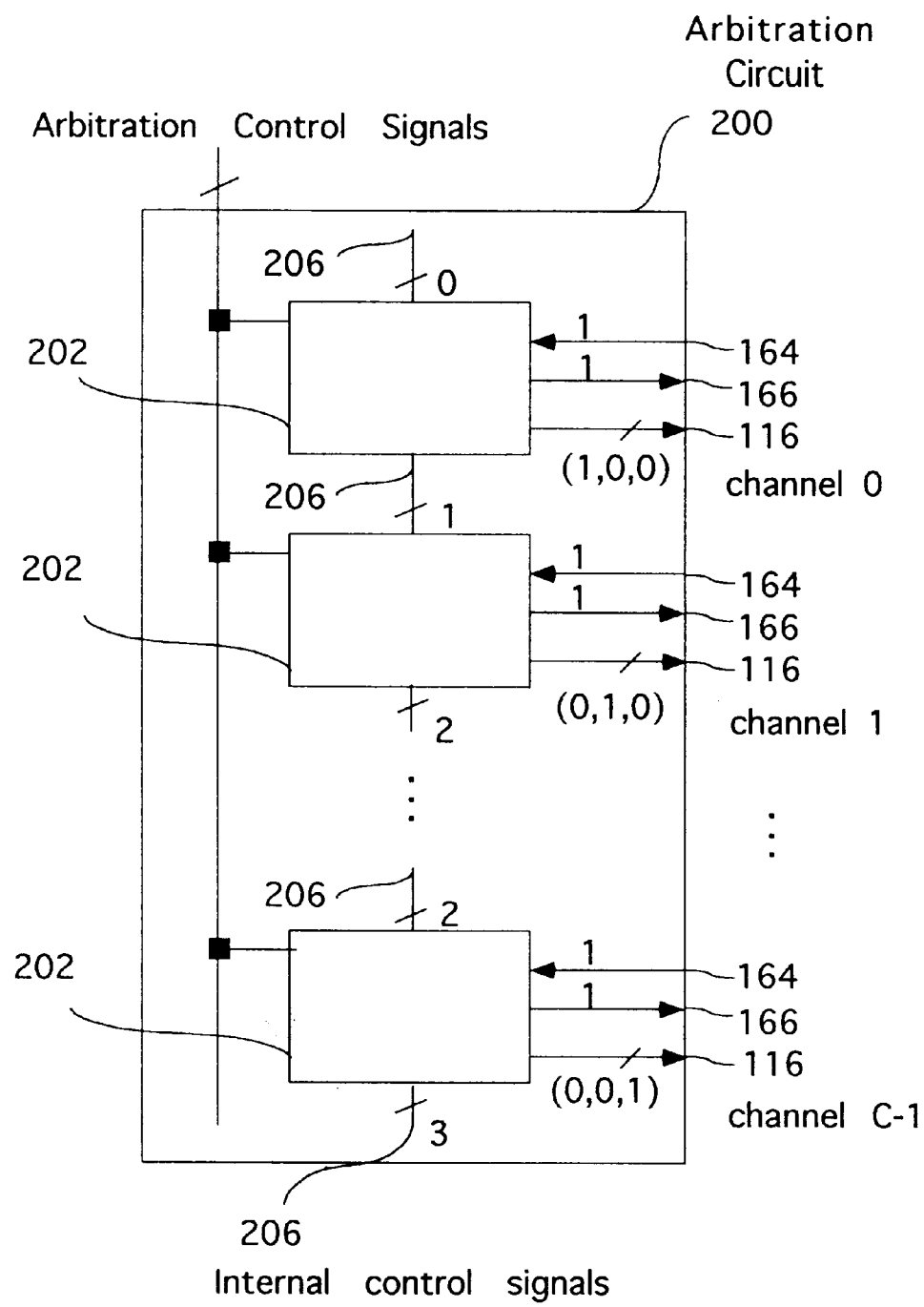
Fig. 29. Example of arbitration circuit for a slice.

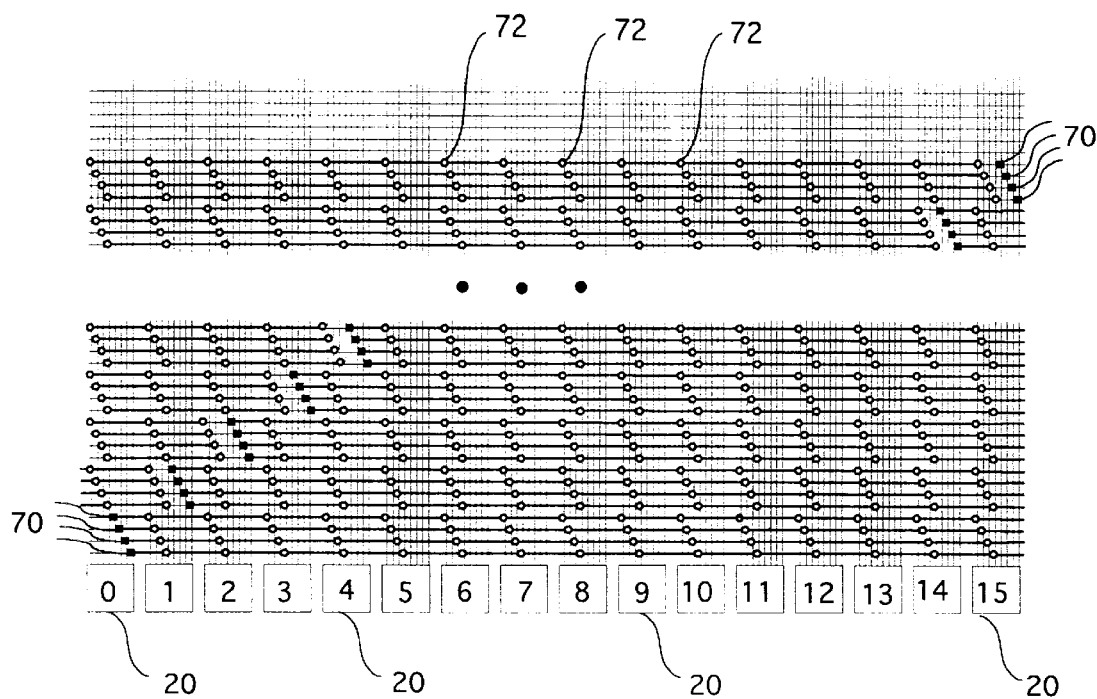
Fig. 30. Embedding of a MultiChannel Broadcast Switch into the Circular HyperPlane.

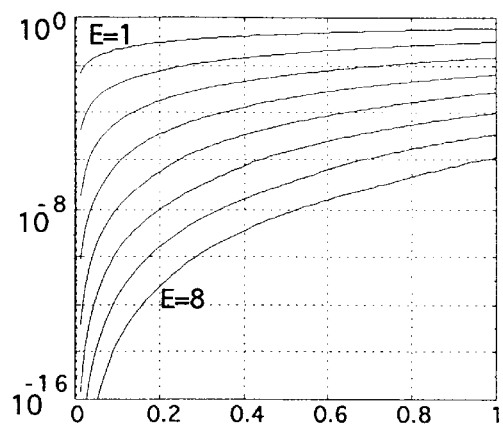
Fig. 31a. Blocking probability vs. offered load.
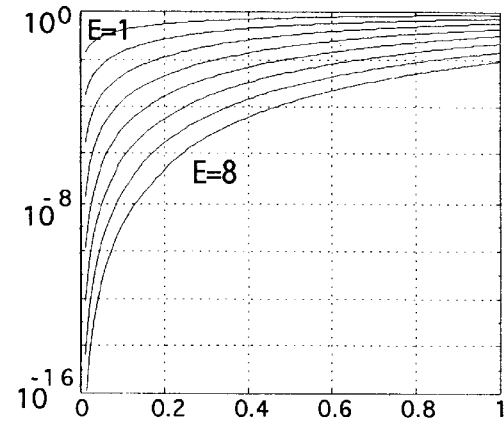
Fig. 31b. Blocking probability vs. offered load.
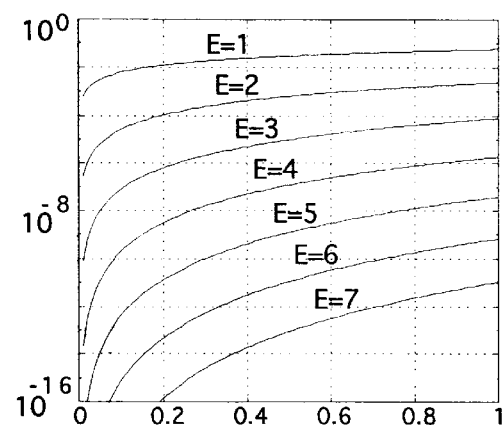
Fig. 31c. Blocking probability vs. offered load.
Fig. 31. Blocking probability in a smart pixel array.

Fig. 32. Clock divider and multiplier circuits.

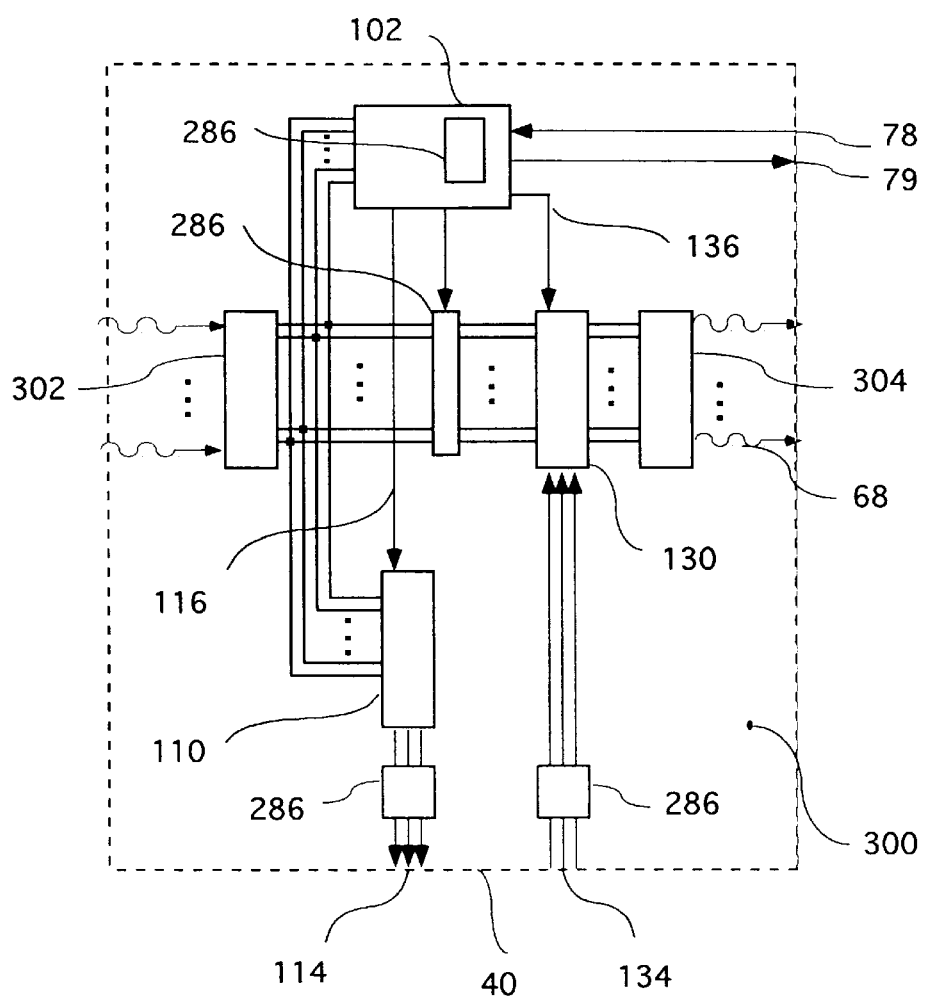
Fig. 33. Typical optoelectronic data processing and switching means.

OPTOELECTRONIC SMART PIXEL ARRAY FOR A RECONFIGURABLE INTELLIGENT OPTICAL INTERCONNECT

BACKGROUND

1. Field of Invention

This invention relates to the design of reconfigurable intelligent photonic interconnect, in particular to the design and packaging of an opto-electronic data processing and switching means called a "smart pixel array" which make possible the realization of a reconfigurable intelligent optical interconnect which implements multiple reconfigurable optical communication channels. The multiple reconfigurable optical channels can simultaneously support multiple "one-to-one", "one-to-many", "one-to-all" and "many-to-many" broadcast communication patterns and can be reconfigured dynamically.

2. Discussion of Prior Art

A literature and patent search did not reveal any prior art in optoelectronic data processing and switching means for the reconfigurable intelligent optical backplanes and interconnect as proposed in this application. A discussion of prior arts based on electrical and optical backplanes will be given.

In a computer system a bus is an interconnection topology commonly used to communicate between plug-in modules in the form of a printed circuit board (PCB). The plug-in modules connect to a common communication media (i.e., the bus) on the backplane printed circuit board. The rules that govern the access of the modules to the bus and the data transfers constitute the bus protocol. A typical implementation of a bus includes a set of metal traces embedded in a backplane PCB. Plug-in modules connect to the bus through edge connectors and drive the bus through high power bus transceivers. Modules connected to the bus all reside on the same backplane PCB. Various standards have been developed which define the physical features of the backplane PCB, the mechanical packaging structure and the bus protocols. These bus standards include VME, FutureBus+, Multibus and Nubus standards and typical standards are described in a textbook by J. Di Giacom, "Digital Bus Handbook", McGraw Hill.

There are many practical limitations to the use of the bus topologies. In the backplane PCB implementing a bus, each metal trace electronically interconnects all plug-in modules. A typical backplane PCB based upon a standardized 19 inch wide rack (the commercial VME and FutureBus standards) houses approximately 20 plug-in modules. To transfer data a single plug-in module must act as a bus master. Distributed protocols are used to arbitrate between contending plug-in modules to appoint the bus-master. To transfer data a bus-master must insert the information including address information and data in a series of individual word transfers over the bus. Typically each word contains 32 bits and the duration of the word transfer is determined by the nature of the bus protocol.

When transferring data the master plug-in module must drive the bus traces on the backplane PCB which in turn must drive all the plug-in modules inserted into the backplane PCB, which can be as high as 20 plug-in modules. The capacitive loading on a bus due to the attached modules greatly increases the propagation delay. This directly affects the data transfer rate in most types of data transfer protocols, for example synchronous protocols in which data transfers are centrally clocked, and in compelled asynchronous protocols which require a handshake on every data transfer. The only data transfer which is not heavily impacted by the bus round trip delay caused by capacitive loading is the uncompelled source synchronous bus transfers in which a long burst transfer is clocked by the sender. In such a transfer the data transfer rate is primarily limited by skews between bits and strobe.

The capacitive loading also decreases the impedance of a bus line to a very low value, i.e., approximately 20 ohms. Since a bus driver sees half the bus impedance i.e. 10 ohms, high currents are required to drive the bus at full speed. For example, a 3 volt swing on a bus which is typical for TTL will require 300 milliAmps (3 volts divided by 10 ohms) to drive the bus on the first transition with proper termination. Since most bus drivers are rated at only 50 to 100 MA the bus is typically under terminated and dependent upon multiple reflections to build up the signal to the final level. The reflections take one or more bus round trip delays to settle resulting in a settling time delay that is a significant portion of the transfer cycle time for a bus.

These limitations limit the aggregate bandwidth of the FutureBus+ to approx. 3.2 GByte/sec or 25.6 Gbit/sec, i.e., the sum of all data communications between plug-in modules cannot exceed approx. 25.6 Gbit/sec since this is the maximum capacity of the bus. In addition to low bandwidths, electronic busses suffer from other limitations. Electronic busses lack multiple independent channels and thus they cannot provide the parallelism required by large scale parallel computing and communication systems. Finally, electronic busses are not scalable to interconnect hundreds of plug-in modules since the increasing capacitance, inductance and impedance problems of a larger bus will lower the already low bandwidth of the bus.

These limitations of electrical busses have not gone unnoticed. In U.S. Pat. No. 5,122,691 Balakrishnan describes a bus architecture which reduces the bus round trip delay by incorporating the busses on an integrated circuit called the bus IC. The plug-in modules have point-to-point links connecting them to the bus ICs. These point-to-point links have a relatively small capacitive load so high power bus transceivers are not required. The bus protocol of the system remains unchanged, i.e. a distributed bus protocol such as the FutureBus+ protocol is used to determine a bus master which transfers data over the bus to one or more bus slaves in a series of individual word transfers according to the protocol. However, the bus transfers are now faster due to the decreased capacitive loading, typically by a factor of 2 or 3.

There are number of problems with Balakrishnan's architecture. First, the bus still supports a single channel where all plug-in modules compete for access to the single channel. At most two plug-in modules can communicate over the bus simultaneously, and the individual word transfers over the bus are still sequential—the improvement over the existing bus performance is a factor of 2 or 3. The bus is electrical and as a result it will always suffer from capacitance, inductance and impedance problems. Finally, it is not scalable to interconnect hundreds of plug-in modules.

Current large communication and computing systems have communications requirements in the hundreds of Gigabits/sec or more. The Cray T3D supercomputer communication mechanism is described in "CRAY T3D System Architecture Overview", Sep. 23, 1993, available from Cray Research, Chippewa Falls, Wis. The electronic bus is far too slow to meet the communication demands of a large computing system. In the Cray system processors reside on PCB modules and the modules are interconnected in the form of a 3 dimensional mesh which occupies many large cabinets.

Every node has a direct electronic communication link to two nearest neighbors in each of three dimensions. Each communication link is a point-to-point datapath with 16 bits of data and 8 bits of control. The link is clocked at rates of 150 Mbit/per sec., so that the link has a point-to-point data bandwidth of 2.4 Gbit/sec. A large T3D supercomputer may consist of 1,024 nodes arranged in a 8×8×16 mesh. The bisection bandwidth of a network is defined as the bandwidth which crosses a bisector which cuts the network into two halves of equal size. If we cut the mesh into two equal size smaller meshes of size 8×8×8, there are 128 communication links joining these two halves. (This figure includes 64 links between the inner sides of the two halves and 64 links which join the outer sides of the two halves). Hence, the bisection bandwidth of the Cray T3D is 128 links times 2.4 Gbit/sec per link or equivalently 307 Gbit/sec.

However, there are many limitations to the electronic interconnects used in current large scale computing and communication networks. These networks have much more bandwidth than a bus by providing multiple independent high bandwidth communication channels. However, the cost of these multiple channels is a large number of electronic wires between cabinets and electronic traces on PCBs. The inductance and capacitance of these wires and traces necessitates the use of high power transceivers which consume large amounts of power. The inductance and capacitance of these channels also limits the maximum clock rate to at best a few hundred Mbit/sec. The electrical channels are also susceptible to electromagnetic interference.

Hamanka describes a passive optical bus in "Optical bus interconnection system using Selfoc lenses", Optics Letters, Vol. 16, No. 16, Aug. 15, 1991. In this passive optical bus the electronic bus transceivers of the plug-in modules of an electronic bus are replaced by optical bus transceivers. The receiving circuit in an electrical backplane is replaced by a photodetector array. The transmitting circuit in an electrical backplane is replaced by a light modulator. The communication medium responsible for the transferring of data is changed from metal traces on a backplane PCB to optical paths through free-space or an optical medium.

However, Hamanaka's passive optical bus still suffers from many disadvantages associated with the electronic bus. The optical bus still supports a single communication channel so that data transfers still occur sequentially over the bus. Hamanaka's passive optical bus does not implement multiple independent optical channels. A data transfer requires the same steps as in an electrical backplane. A bus master is first selected and the bus master then broadcasts data over the optical bus which must be received by all plug-in module PCBs. These PCBs then must perform packet processing to determine whether the packet is addressed to them. This architecture requires that every plug-in module PCB must be able to monitor all data on the optical bus. The limitation that every PCB must monitor all the data on the optical bus will limit the rate at which data can be transmitted over the bus to the rate at which every PCB can receive and process the data.

An integrated circuit (IC) has a limited electronic Input/Output IO bandwidth of typically tens of Gigabits/second due to IC packaging constraints. Each IC package has at most approx. 500 hundred IO pins due to constraints associated with the connections between the IC substrate and the IC package. A discussion of IC packaging limitations is given in L. L. Moresco, "Electronic System Packaging: The Search for Manufacturing the Optimum in a Sea of Constraints", IEEE Transactions on Components, Hybrids, and Manufacturing Technology", Vol. 13, No. 3, September 1990. Two common techniques to interconnect an integrated circuit VLSI die with a package are "wire-bonding" and "tape automated bonding". These techniques are described in R. R. Tummala and E. J. Rymaszewski (Ed.), "Micro-Electronics Packaging Handbook", Reinhold, 1989. Each IO pin has a maximum clock rate of typically a few hundred Mbits/second due to capacitance and inductance and crosstalk associated with the connections between the die and the package. The maximum IO bandwidth of a single IC package is the product of the number of pins times the clock rate per pin. The maximum IO bandwidth of a packaged IC is typically in the tens of Gigabits/second.

Hamanaka's architecture requires that optical signals be received on a photodetector array, all converted to electronics, and all routed off the array to an electronic IC for further processing. Hence, the peak bandwidth of Hamanaka's passive optical bus architecture will be limited to the peak IO bandwidth of an electronic integrated circuit, typically tens of Gigabits/second. Hence, Hamanaka's passive optical bus is simply a faster version of a conventional electronic bus and it does not provide the high bandwidth required by large scale computing and communication systems.

Oh and Kostuk have compared an electronic FutureBus+ with an optical FutureBus+ for example using Hamanaka's passive optical backplane in "Comparison of the Performance Characteristics of FutureBus+ with an Optical Backplane", Proceedings of the 1995 International Conference on Optical Computing, March 1995. Their analysis indicate that each individual word transfer over the optical bus will be 3 or 4 times faster than the electrical bus. This conclusion illustrates the problems with passive optical backplanes such as Hamanaka's; the performance improvement over an electronic bus is a mere factor of 3 or 4, which is achievable electronically as well for example by using the bus IC architecture proposed by Balakrishnan in U.S. Pat. No. 5,122,691 and described earlier.

Redmond and Schenfeld have presented a passive reconfigurable optical interconnect in "A Distributed, Reconfigurable Free-Space Optical Interconnection Network for Massively Parallel Processing Architectures" and in a related paper "Experimental Results of a 64 Channel Free-Space Optical Interconnection Network for Massively Parallel Processing", in the Proceedings of the International Conference on Optical Computing, Aug. 22–25, 1994. This passive optical architecture is similar to Hamanaka's optical bus. The receiving circuit in an electrical backplane is replaced by a photodetector array. The transmitting circuit in an electrical backplane is replaced by a Vertical Cavity Surface Emitting (VCSEL) laser array where every laser is individually addressable. The communication medium responsible for the transferring of data is changed from metal traces on a backplane PCB to optical paths through free-space. (Integrated VCSEL arrays are further described by J. Jewell et. al. in "Vertical-Cavity Surface-Emitting Lasers: Design, Growth, Fabrication, Characterization", IEEE Journal of Quantum Electronics, Vol. 27, No. 6, June 1991.)

This architecture suffers from the same limitations as Hamanaka's optical bus and a few new limitations. The authors emphasize that a key principle guiding their architecture is "logic-less" optical operation. They state that optical technology is used only to provide point-to-point high bandwidth connectivity and nothing else. Their architecture does not support broadcast channels, it does not support one-to-many communications over a single channel, it does not support one-to-all communications over a single channel, it does not support simultaneous many-to-many communications over multiple channels. The architecture is slowly reconfigurable as Redmond and Schenfeld argue that reconfiguration is not needed very often. Slow reconfiguration is achieved by supporting a fixed number of configurations in separate electronic switches. Since their architecture is a passive optical interconnect only, there is no notion of addresses or packets inherent to the architecture. The architecture simply implements multiple passive point-to-point interconnects with no broadcasting.

Broadcasting is a fundamental requirement of parallel computing systems which use "snoopy" caches. Snoopy caches are described in J. L. Hennessy and D. A. Patterson, "Computer Architecture: A Quantitative Approach", Beta version, Morgan Kauffman, 1995. Since this architecture cannot support broadcasting it will have no use in computing and communications systems which require efficient broadcasting, such as computing systems using snoopy caches.

Another key limitation of this architecture is the fact that the optical signals which are received on a photodetector array must be converted to electronics and routed off the array package to an external electronic IC package for further processing. This limitation will limit the peak bandwidth of the optical architecture to the IO bandwidth of a single IC which is typically in the tens of Gbits/sec. Another key limitation of this architecture is the fact that every individual laser in the VCSEL laser array is individually accessible from an IO pin on the VSCEL package. This limitation also implies that the peak bandwidth of their passive optical interconnect will be equal to the peak IO bandwidth of an IC package: the peak bandwidth is limited to the bandwidth which can be supplied to one VCSEL array package or removed from one photodetector array package, which is typically in the tens of Gbits/second.

Finally, the architecture will have optical power limitations as the number of receivers increases. The architecture does not allow for the regeneration of optical signals. A fraction of each optical signal is delivered to each photodetector receiver through the use of partially reflective micromirrrors. This technique will allow an optical signal to be delivered to a small number of receivers, but it cannot be used to interconnect a large number of receivers since the original optical signal can only pass through a limited number of partially reflective mirrors before the signal is lost. For example, if each micromirror reduces the optical signal power by only 20%, then after passing through 10 micromirrors the optical signal power is approximately 1 tenth of its original value. Passing through another 10 mirrors will reduce the signal power to 1 one-hundredth of its original value. Hence, the lack of optical signal regeneration will limit scalability. Cloonan describes a photonic switching system based upon smart pixel arrays in U.S. Pat. No. 5,289,303 "Chuted, Optical Packet Distribution Network", Feb. 22, 1994. Cloonan describes the means for distributing packets of data based upon multiple stages of binary switches or nodes which receive data optically, switch data, and transmit data optically, repeatedly through a series of stages of such devices. The switching architecture is "self-routing" which implies an inherent notion of a packet of data with a header which contains addressing information. The nodes perform processing functions which enable them to change their states in order to propagate the connections in the appropriate direction within the switching network. Multiple nodes are implemented on a single smart pixel array using the FET-SEED smart pixel technology which is further described in the patent.

However, the architecture suffers from many disadvantages. The switch does not allow "locality" between communicating modules i.e., all connections must propagate through all stages of the network . The switch has an input side where all data must enter and an exit side where all data must exit. All communications, even those between modules which are physically close together, must enter the switch at the input side, travel through all the stages of devices and exit the switch at the output side, which can require excessive amounts of time. In a large system the length of fiber just to get data to the input side can cause excessive delays and similarly for the output side. Such multistage switch architectures have largely been abandoned by the parallel computing community, where fast communications between neighboring modules is very important. Furthermore, this switch architecture does not support plug-in modules or data transfers between neighboring plug-in modules.

A literature and patent search did not reveal any prior art in reconfigurable intelligent optical backplanes. The searches indicate that the first proposal of an reconfigurable intelligent optical backplane was by the authors of this application in a paper, T. Szymanski and H. S. Hinton, "Architecture of Terabit Free-space Photonic Backplane", in the Proceedings of the International Conference on Optical Computing, Aug. 22–25, 1994 which described aspects of a reconfigurable optical backplane. In addition, a paper by T. Szymanski and H. S. Hinton entitled "A Smart Pixel Design for a Dynamic Free-Space Optical Backplane" in the Proceedings of the IEEE LEOS Summer Topical Meetings, July 1994 described aspects of the smart pixel arrays for such a backplane. Another talk by T. Szymanski and H. S. Hinton entitled "Graph embeddings in a Free-space photonic backplane" was presented at the IEEE International Conference on Applications of Photonics in Technology, Jun. 21–23, 1994. More recently a paper by T. Szymanski, "Intelligent Optical Backplanes", an invited paper presented at the Proceedings of the International Conference on Optical Computing, Mar. 13–16, 1995, described advanced processing functions of intelligent optical backplanes.

Objects and Advantages

Accordingly, several objects and advantages of the proposed smart pixel arrays for an intelligent photonic system are as follows.

(a) The proposed smart pixel arrays can support multiple dynamically reconfigurable high bandwidth broadcast based communication channels between modules. These multiple independent channels allow for many "one-to-one", "one-to-many", "one-to-all" and "many-to-many" broadcast based communications patterns between modules to occur simultaneously. This capability allows the intelligent photonic interconnect system to be much more powerful and flexible than a passive optical point-to-point interconnect which cannot perform broadcasting.

(b) The communication patterns between modules is dynamically programmable under external control and the patterns can be changed in nanoseconds by down loading a control bit stream into the smart pixel arrays. This dynamic programmability allows the dynamically programmable intelligent photonic interconnect to be used in parallel computing systems, where the communication patterns which are needed may rapidly change over time. This capability allows the intelligent photonic interconnect system to be much more powerful and flexible than a passive optical point-to-point interconnect which is very slowly reconfigured (in the order of seconds per reconfiguration).

(c) The smart pixel arrays contain on-chip data processing means which allow the smart pixel array to simultaneously process the hundreds of Gbits/second of optical data as it travels down the optical interconnect. With this capability a smart pixel array can be selective of which data it wishes to extract from the photonic interconnect and forward to the external electronic data processors. This processing capability allows an intelligent optical interconnect system to implement "one-to-many" broadcast communications patterns mentioned earlier. A sending module may specify a list of intended receivers and insert the data onto the intelligent interconnect. The smart pixel arrays will transport and simultaneously process the data and deliver it to all intended receivers and only those intended receivers.

(d) The smart pixel arrays can process the hundreds of Gbits/second of optical data as it travels down the optical interconnect and selectively extract key data from the photonic interconnect for forwarding to the external electronic data processors. This selective reception of data overcomes a major limitation of passive photonic interconnects. In an intelligent photonic interconnect each optical receiver does not need to forward all optical data to an external electrical processor for processing. Hence, the peak bandwidth of an intelligent photonic interconnect is not limited to the IO bandwidth of an IC package. An intelligent optical interconnect can transport terabits of data per second while delivering tens of Gbits/sec to each thereby honoring the packages limited IO bandwidth. Hence, the intelligent photonic interconnect has a much higher peak bandwidth than a passive point-to-point optical interconnect, where every passive photodetector array must route all incoming optical data off chip to an external electrical processor, thereby limiting the peak bandwidth of the passive optical interconnect to the IO bandwidth of an IC package.

(e) Each packaged smart pixel array provides a means of interfacing between the electronic domain where the IO bandwidth is limited to the tens of Gbits/second due to IC packaging constraints, to the high speed optics domain where the peak IO bandwidth is in the hundreds of Gbits/sec and potentially Terabits/sec range. The proposed smart pixel array design therefore allows for the efficient interfacing between a low bandwidth electronic domain and much higher bandwidth optical domain. The proposed smart pixel array design can therefore be used with a variety of existing IC packaging technologies and a variety of smart pixel array technologies.

(f) Due to their dynamic programmability and architecture, the smart pixel arrays can be used to embed all popular point-to-point networks used in parallel computing and communications, including 2 dimensional and 3 dimensional meshes and hypercubes, into the optical interconnect by programming the smart pixel arrays accordingly. Hence the reconfigurable intelligent optical interconnect will be considerably more powerful and flexible than passive optical busses which implement single non-reconfigurable channels.

(g) Due to their dynamic programmability and ability to process data and selectively extract key data, the smart pixel arrays can be used to embed popular switching networks used in parallel computing and communications. Many parallel computers and communication systems rely upon multiple broadcast channels to implement packet switching of data. The proposed smart pixel arrays can be programmed to implement these packet switching schemes based on multiple parallel broadcast channels by embedding multiple parallel broadcast channels into the intelligent optical interconnect. Hence, the reconfigurable intelligent optical interconnect will be considerably more powerful and flexible than passive optical busses which implement single non-reconfigurable channels, and passive optical interconnects which implement only point-to-point interconnects.

(h) Due to their dynamic programmability and flexibility the smart pixels arrays of the same design can be batch fabricated in large quantities while still covering a large market share. Batch fabrication of a large number of such identical devices will lower the per unit cost significantly, since the custom fabrication of individual devices is not cost effective. A single smart pixel design can be used in the field of parallel computing, to embed 2 dimensional and 3 dimensional meshes and hypercubes, and to embed active packet switches based on multiple broadcast channels, by embedding multiple broadcast channels directly into the intelligent optical interconnect. The ability to appeal to a large market share with the same basic design can significantly lower the cost of such devices.

(i) Due to the dynamic programmability of the smart pixels arrays the network embedded into the photonic interconnect can be reconfigured in the presence of faulty PCBs, thereby increasing fault tolerance.

(j) The ability of an intelligent optical interconnect to process hundreds of Gbits/sec and potentially Terabits/sec will improve the performance of large parallel computing systems. Currently, many critical basic functions are implemented in hardware in a large computing system to improve the performance. Such functions include data transfer acknowledgment, synchronization primitives, resource allocation, flow control and error control, and media access control. All of these critical functions can be implemented over channels in the reconfigurable intelligent optical interconnect, by allocating channel bits for these purposes and performing the necessary processing directly in the smart pixel arrays.

(k) The smart pixel arrays regenerate the optical signals that logically pass through them to full optical power levels. Hence, optical signals can logically pass through large numbers of smart pixel arrays without any loss in power. The reconfigurable photonic interconnect made possible through the use of the proposed smart pixel arrays is scalable to hundreds or even thousands of modules, unlike passive optical architectures which do not regenerate signal power levels and are therefore limited to relatively small sizes.

(l) The proposed smart pixel arrays can be optically interconnected using relatively standard optical imaging techniques such as the use of 2 dimensional fiber bundles. Processing modules which are physically separated meters apart can be interconnected with a distributed reconfigurable intelligent optical interconnect using the proposed smart pixel arrays which are themselves optically interconnected using 2 dimensional fiber ribbons.

DESCRIPTION OF DRAWINGS

FIG. 1. illustrates a passive electrical bus backplane (prior art).

FIG. 2. illustrates a passive optical bus backplane (prior art).

FIG. 3. illustrates an optical packet switch (prior art).

FIG. 4. illustrates hardware for optically interconnecting 2 optoelectronic devices (prior art).

FIG. 5. illustrates hardware for optically interconnecting 2 optoelectronic devices (prior art).

FIG. 6. illustrates an optical packet switching architecture (prior art).

FIG. 7. illustrates the structure of an opto-electronic node (prior art).

FIG. 8. illustrates an optical backplane with smart pixel arrays on plug-in modules.

FIG. 9. illustrates an optical backplane with smart pixel arrays on multiple backplane PCBs.

FIG. 10 illustrates a connectivity model for reconfigurable intelligent optical backplane.

FIG. 11 illustrates a packet switch based on reconfigurable intelligent optical backplane.

FIG. 12 illustrates a typical IO specification of a smart pixel array for a reconfigurable intelligent optical backplane.

FIG. 13 illustrates the structure of a basic smart pixel.

FIGS. 14(a)–(d) illustrate four basic states of a smart pixel with active datapaths shown in bold.

FIG. 15 illustrates a 2 dimensional array of pixels called a slice.

FIG. 16 illustrates an extractor-selector circuit and one implementation based on multiple extractor selector cells.

FIG. 17 illustrates structures for extractor-selector cells for realizing extractor-selector circuit.

FIG. 18 illustrates injector-selector circuit and one implementation based on multiple injector-selector cells.

FIG. 19 illustrates a decoder for writing control bits to control latches.

FIG. 20 illustrates the structure of programmable delay circuit.

FIG. 22 illustrates a typical structure of the synchronization circuit.

FIG. 23 illustrates typical packet header processing for determining data to extract.

FIGS. 24(a)–(f) illustrate smart pixel organizations with varying ratios of electrical to optical bandwidth.

FIG. 26 illustrates an embedding of a 512 Processor Cray T3D Supercomputer onto a Circular HyperPlane with 32 PCBs.

FIG. 27 illustrates an arbitration Circuit for a slice and one implementation based on multiple arbitration cells.

FIG. 28 illustrates structure of an arbitration cell for realizing arbitration circuit.

FIG. 29 illustrates an examples of arbitration circuit in operation.

FIG. 30 illustrates an embedding of a multichannel broadcast switch into the Circular HyperPlane.

FIGS. 31(a)–(c) illustrate the blocking probability in a smart pixel array due to contention for extractor-channels

FIG. 33 illustrates the proposed packaged optoelectronic data processing and switching means.

Figure 21A:
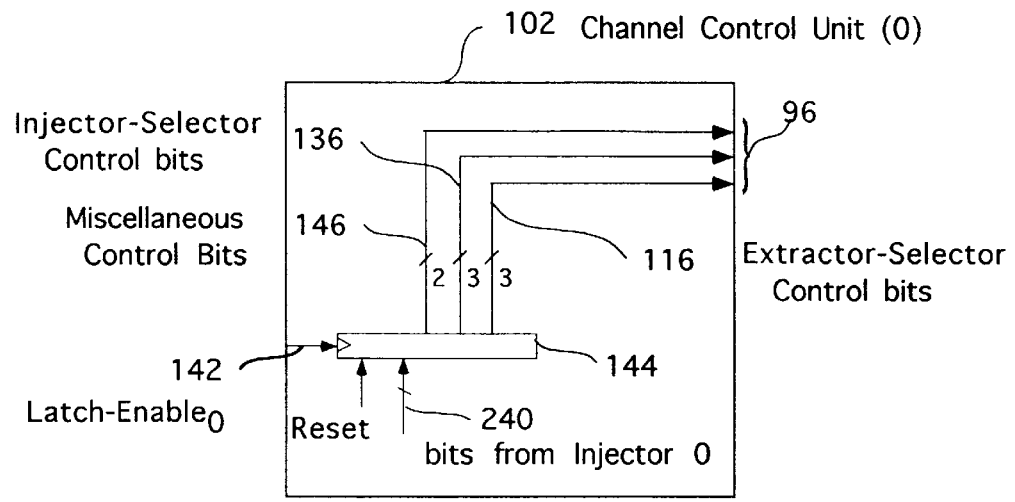
FIGS. 21(a)–(b) illustrate channel control units.

| List of Reference Numerals |
| --- |
| 20 plug-in module (PCB) |
| 22 edge connectors |
| 24 electronic ICs or MCMs |
| 26 backplane PCB |
| 28 metal traces on backplane PCB |
| 32 transparent Spatial Light Modulators (SLMs) |
| 34 transparent photodetector arrays (PDs) |
| 40 smart pixel array optoelectronic device |
| 42 packet distribution network |
| 44 2 dimensional fiber array |
| 46 optical hardware module (OHM) |
| 48 input port side |
| 50 output port side |
| 52 opto-mechanical support structure |
| 64 upstream optical data flow |
| 66 downstream optical data flow |
| 68 optical IO channels |
| 69 optical clock |
| 70 injection point |
| 71 outgoing clock |
| 72 extraction point |
| 74 optical channel connection |
| 76 fiber IO |
| 78 control inputs |
| 79 control outputs |
| 80 individual smart pixel |
| 82 one bit optical input port (means) |
| 83 one bit optical output port (means) |
| 84 programmable delay circuit - data storage means |
| 85 D Flip Flop data storage means |
| 86 extractor-selector cell (1 bit) |
| 88 injector-selector cell (1 bit) |
| 90 one bit of an extractor channel |
| 92 one bit of an injector channel |
| 94 address comparison circuit data processing means |
| 96 control signals from channel control unit |
| 100 slice |
| 102 channel control unit data processing and data storage means |
| 104 control input (address bits) |
| 110 extractor-selector data switching means |
| 112 incoming optical channels |
| 114 electrical extractor channels |
| 116 extractor-selector control signals |
| 118 extractor-selector cells |
| 120 binary multiplexers |
| 122 3 state buffers |
| 130 injector selector data switching means |
| 132 outgoing optical channels |
| 134 electrical injector channels |
| 136 injector-selector control signals |
| 138 injector-selector cells |
| 140 1-of-n decoder |
| 142 latch-enable control signals |
| 143 control-latch-enable |
| 144 control latch data storage means |
| 146 control signals |
| 148 one bit of incoming optical channel |
| 150, 152 output signals |
| 154 arbitration cell |
| 156 mode-multiplexer |
| 158 synchronization unit |
| 160 address-comparator signal |
| 162 valid-header signal |
| 164 request control signal |
| 166 acknowledge control signal |
| 180 exclusive-or logic gate |
| 182 or gate |
| 184 inverter gate |
| 186 long distance optical datapath |
| 200 arbitration circuit |
| 202 arbitration cells |
| 204 count control signals |
| 206 adder circuit |
| 208 comparator |
| 210 less-than-or-equal circuit |
| 212 decoder |
| 220 clock divider circuit |
| 222 counter |

-continued

List of Reference Numerals

| | |
|---|---|
| 224 | demultiplexer |
| 226 | multiplexer |
| 240 | injector channel 0 |
| 242 | injector channel 1 |
| 248 | extractor selector control bits from arbitration cell |
| 250 | latch |
| 252 | control bit |
| 260 | address latch |
| 262 | bits from broadcast mask in control latch |
| 270 | packet header bits on channel |
| 272 | address bits from address latch |
| 280 | broadcast bit |
| 282 | count on input side |
| 284 | count on output side |
| 286 | data storage means |
| 300 | packaging means |
| 302 | optical I/O channel input means |
| 304 | optical I/O channel output means |

SUMMARY

The proposed packaged smart pixel array optoelectronic data processing and switching means comprises an optical-to-electronic (OE) "optical channel input means", an electronic-to-optical (EO) "optical channel output means", "electrical channel input means", an "electrical channel output means", an electronic control input means for supplying control, and electronic control output means for supplying control, a data switching means for switching data from optical channel input means to electrical channel output means, a data switching means for switching data from electrical channel input means and optical channel input means to optical channel output means, an optional data storage means, a data processing means for processing data and control signals and generating the internal control signals for the data switching and data storage means, and a packaging means which packages all these means onto a single package with identifiable input and output port means.

DESCRIPTION OF INVENTION

FIG. 1 illustrates a prior art passive electronic bus. Each plug-in module 20 has multiple edge connectors 22 which are electrically coupled to the integrated circuits (ICs), multichip modules (MCMs) and devices 24 contained on the plug-in module. The backplane PCB 26 is at the rear of the rack and it contains multiple edge connectors (not shown) which couple with the plug-in module edge connectors 22 when the plug-in modules are inserted into the backplane PCB. The metal traces of the bus 28 are physically long in length, typically 20 inches.

FIG. 2 illustrates a prior art passive optical backplane as described in Hamanka. Plug-in modules 20 contain transparent spatial light modulators (SLM) 32 and transparent photodetectors (PD) 34. When multiple plug-in modules are inserted into the rack, all the opto-electronic devices are aligned and manage to transfer optical data between themselves.

FIGS. 3 to 7 illustrate a prior art optical packet switching system described in T. Cloonan, U.S. Pat. No. 5,289,303 "Chuted, Optical Packet Distribution Network", Feb. 22, 1994. In FIG. 3 many smart pixel array integrated circuits 40 are optically interconnected to implement a packet distribution network 42. Optical data is delivered to the input side and removed from the output side using 2 dimensional fiber arrays or 2D fiber bundles 44. The optical interconnection between two devices is accomplished with an "optical hardware module" (OHM) 46 which is shown in detail in FIG. 4.

FIG. 4 illustrates the structure of an optical hardware module 46 connecting two smart pixel arrays 40. A detailed description can be found in T. Cloonan, U.S. Pat. No. 5,289,303 "Chuted, Optical Packet Distribution Network", Feb. 22, 1994 and references contained therein.

FIG. 5 illustrates the direction of optical flow associated with FIG. 4.

FIG. 6 illustrates an optical packet distribution network consisting of multiple stages of smart pixel arrays 40, and an input port side 48 and an output port side 50.

FIG. 7 illustrates the structure of a binary switching node, many of which are implemented on a single smart pixel array 40 (not shown). A detailed description can be found in T. Cloonan, U.S. Pat. No. 5,289,303 "Chuted, Optical Packet Distribution Network", Feb. 22, 1994 and references contained therein.

FIG. 8 illustrates an embodiment of an optical backplane. Each plug-in module 20 contains multiple smart pixel arrays 40, multiple electronic integrated circuits 24, an opto-mechanical support structure 52 and a large number of optical I/O channels 68.

FIG. 9 illustrates an alternative embodiment of an optical backplane. Each backplane PCB 26 contains multiple smart pixel arrays 40 interconnected with optical I/O channels 68. Since the smart pixel arrays are mounted flat on the backplane PCB similar to the arrangement shown in FIG. 3 the same optomechanical hardware modules 46 described in FIG. 4 (not shown) can be used to optically interconnect the smart pixel arrays. Metal traces 28 carry data between the smart pixel arrays and the plug-in modules (not shown) which couple to the backplane PCB using the edge connectors 22.

FIG. 10 illustrates a typical connectivity model for a reconfigurable intelligent optical backplane with 2 optical datapaths, upstream and downstream. Plug-in modules 20 are assigned integer addresses and have associated smart pixel arrays 40. Each smart pixel array 40 has multiple electronic injector channels 134 and multiple electronic extractor channels 114. (Not all smart pixel arrays are highlighted.) The backplane has an upstream optical data flow 64 and a down stream optical data flow 66, where each stream consists of many optical channels 68, where all channels are typically 8 bits wide (the channels can have any width). A connection between an electrical injector channel 134 and an optical channel 68 is called an injection point 70 and a connection between an electrical extractor channel and an optical channel is called an extraction point 72. An optical channel connection 74 between an injection point and one or more extraction points is illustrated with a bold line.

FIG. 11 illustrates a packet switch based on the reconfigurable intelligent optical backplane. Multiple plug-in modules 20 are optically interconnected through the optical I/O channels 68. Data arrives on incoming fibers 76, is processed on the plug-in modules 20, is switched over the optical I/O channels 68 to another plug-in module 20, where it is ultimately sent out over another fiber 76.

FIG. 12 illustrates the typical electrical input-output (IO) specifications of a packaged smart pixel array for a reconfigurable intelligent optical backplane. The interface consists of electrical injector channels 134, electrical extractor channels 114, control inputs 78 and control outputs 79. The smart pixel array also has an optical interface consisting of incoming and outgoing optical I/O channels 68 which may include optical control signals.

FIG. 13 illustrates the typical structure for an individual smart pixel 80. When the structure is implemented onto an integrated circuit certain components may be placed on the substrate in physically different areas although the logical connectivity will not change. The pixel has a one bit optical input port 82, a one bit optical output port 83, an optional "programmable delay circuit" data storage means 84, a extractor-selector cell 86, an injector-selector cell 88, one bit of many extractor channels 90, one bit of many injector channels 92, an address comparison circuit data processing means 94, and control signals 96 from channel control unit data processing means not shown. (A pixel may process many bits of optical data simultaneously rather than just 1 bit).

FIG. 14 illustrates the functions of an individual pixel and will be discussed in the next section.

FIG. 15 illustrates a 2 dimensional array of individual pixels called a slice 100. A slice consists of multiple individual pixels 80, the bits of multiple injector channels 92, the bits of multiple extractor channels 90, multiple channel control unit data processing and data storage means 102, control input in the form of bits of an address 104, an optional data storage means for storing address inputs 104 (not shown), and a 1-of-n decoder 140 and additional control inputs.

FIG. 16 illustrates an extractor-selector 110 data switching means interfacing with multiple incoming optical channels 112 and multiple outgoing electrical extractor channels 114. The switching means is controlled by extractor-selector control signals 116, and the unit can be (but is not necessarily) composed of multiple extractor-selector cells 118.

FIG. 17 illustrates typical structures of extractor-selector cells 118. FIG. 17(*a*) illustrates a cell composed of 2-to-1 binary multiplexers 120 which are controlled by extractor-selector control signals 116. The cell extracts one bit from an incoming optical channel 112 and can connect it to one bit of an outgoing extractor channel 114. FIG. 17(*b*) illustrates a cell composed of multiple 3 state buffers 122 which are controlled by extractor-selector control signals 116 which are in the bundle of control signals 96 not shown coming from the channel control unit.

FIG. 18 illustrates a typical injector-selector 130 data switching means interfacing with multiple incoming optical channels 112, multiple outgoing optical channels 132 and multiple injector channels 134. The switching means is controlled by injector-selector control signals 136, and the unit can be (but is not necessarily) composed of multiple injector-selector cells 138.

FIG. 19 illustrates a 1-of-n decoder 140 within each slice (not shown) which is enabled by a control-latch-enable control signal 143. The decoder generates internal latch-enable control signals 142.

FIG. 20 illustrates a typical structure of a programmable delay circuit 84 data storage means, which consists of a D flip flop 85 and binary multiplexers 120 controlled by control signals 146. The unit accepts one bit from an incoming optical channel 148 and generates two outputs, one output 150 to the injector-selector (not shown) and one output 152 to the extractor-selector (not shown).

Figure 21B:
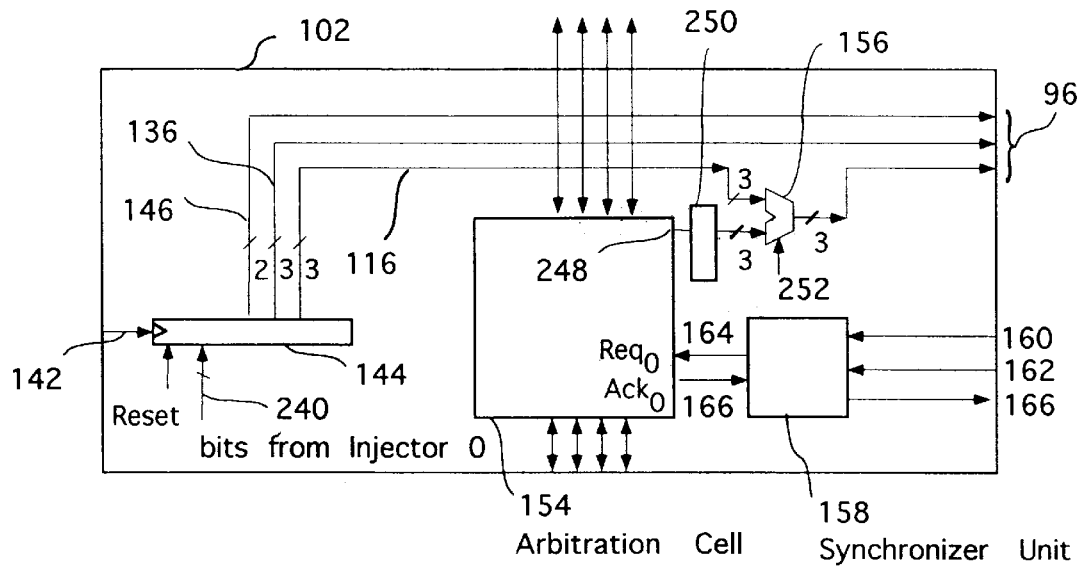

FIG. 21*a* illustrates a channel control unit (CCU) 102 data storage means for a reconfigurable optical backplane. The CCU contains a control-latch 144 data storage means which is controlled by a latch-enable control signal 142 and stores extractor-selector control signals 116, injector-selector control signals 136 and other control signals 146. FIG. 21*b* illustrates a channel control unit (CCU) 102 data processing and storage means for a reconfigurable intelligent optical backplane. The CCU contains a control-latch 144 data storage means which is controlled by a latch-enable control signal 142 and generates extractor-selector control signals 116, injector-selector control signals 136 and other control signals 146. The unit also has an arbitration cell data processing means 154, a mode-multiplexer 156, and a synchronization unit 158. The synchronization unit interfaces to an address-comparator signal 160, a valid-header signal 162, a request signal (req0) 164, and an acknowledge signal (ack0) 166.

FIG. 22 illustrates a typical structure of a synchronization unit 158.

FIG. 23 illustrates a typical packet header data processing means. Each pixel has an address comparison circuit 94, which can be connected together in various ways to generate an address comparator signal 160 which leads to the channel control unit (not shown). Each address comparator circuit 94 consists in this case of an Exclusive-Or logic gate and an Or gate 182. Some circuits also have an inverter gate 184.

FIG. 24 illustrates smart pixel arrays with varying ratios of electrical to optical bandwidth. Each smart pixel array is composed of one or more slices 100, where each slice has incoming electronic injector channels 134 entering the top, incoming and outgoing optical channels 68, and outgoing electronic extractor channels 114 exiting the bottom.

Figure 25A:
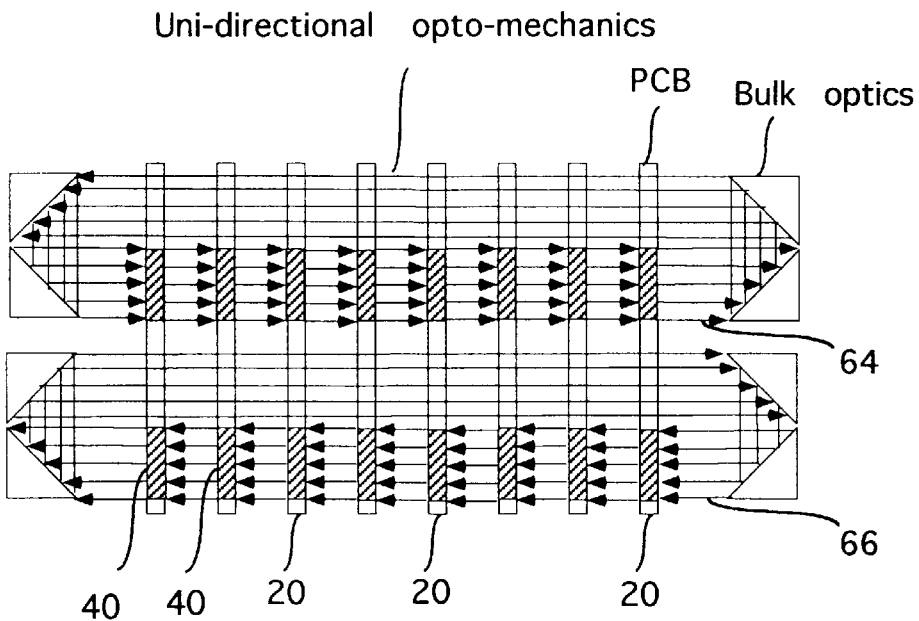
FIGS. 25(a)–(b) illustrate various physical layer topologies of optical backplane.
Figure 25B:
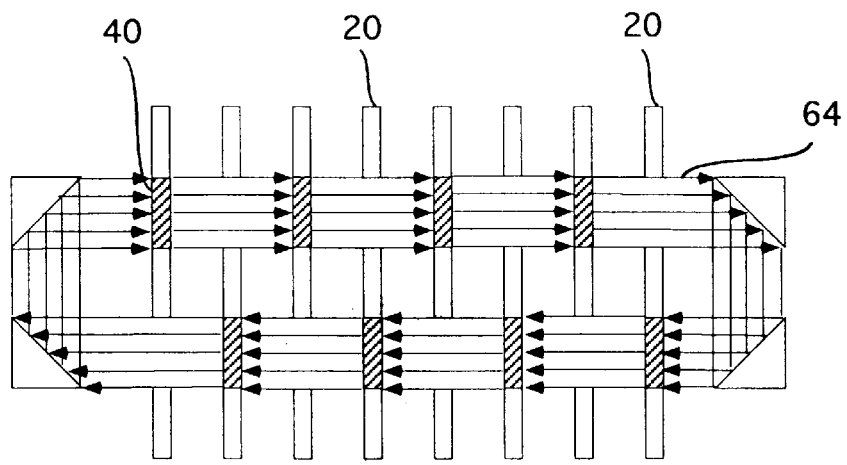

FIG. 25*a* illustrates a physical layer topology for the optical backplane composed of two counter-rotating rings, an upstream optical data flow 64 and a downstream optical data flow 66, interconnecting multiple plug-in module PCBs 20. Each stream has a long-distance optical datapath 186. FIG. 25*b* illustrates an alternative physical layer topology in the form of a unidirectional ring, an upstream optical data flow 64, where this ring has eliminated the long distance optical path 186 from FIG. 25*a*. Two such rings can be used to create a topology with an upstream and a downstream.

A description of a 3D mesh network used in the Cray T3D supercomputer can be found in the previously mentioned documents from Cray Research Inc. FIG. 26 illustrates an embedding of the 3D mesh interconnecting 512 processors in a Cray T3D supercomputer into a photonic interconnect with two streams (an upstream and a downstream). Each plug-in module PCB 20 is assigned a unique address. The embedding consists of multiple optical channel connections 74 between injection points 70 and extraction points 72.

FIG. 27 illustrates an arbitration circuit 200 in a slice 100 not shown. The arbitration circuit can be composed (but not necessarily) of a number of identical arbitration cells 202. The circuit accepts requests control signals 164 from each incoming optical channel 112 (not shown), and generates acknowledge control signals 166 for each outgoing optical channel 132 (not shown). The unit also generates extractor-selector control signals 116 for the extractor-selector data switching means 110 (not shown). The arbitration cells communicate via internal count control signals 282 and 284.

FIG. 28 illustrates the internal structure of an arbitration cell 202 which can be used to realize the arbitration circuit 200. The cell consists of an adder 206, a comparator 208, a less-than-or-equal circuit 210, and a 1-of-4 decoder 212 which generates the extractor-selector control signals 116 for the extractor-selector data switching means 110 (not shown).

FIG. 29 illustrates the operation of the arbitration circuit which will be explained in the next section.

FIG. 30 illustrates the embedding of an active multiple channel broadcast switch into a reconfigurable intelligent optical backplane with a single stream (the upstream). Multiple plug-in models 20 are interconnected with broadcast based optical channel connections 74. Each broadcast channel has a single injection point 70 and multiple potential extraction points 72.

FIG. 31 illustrates the probability a request for an extractor channel will not be satisfied due to contention for extractor channels, and will be described in the next section.

Figure 32A:
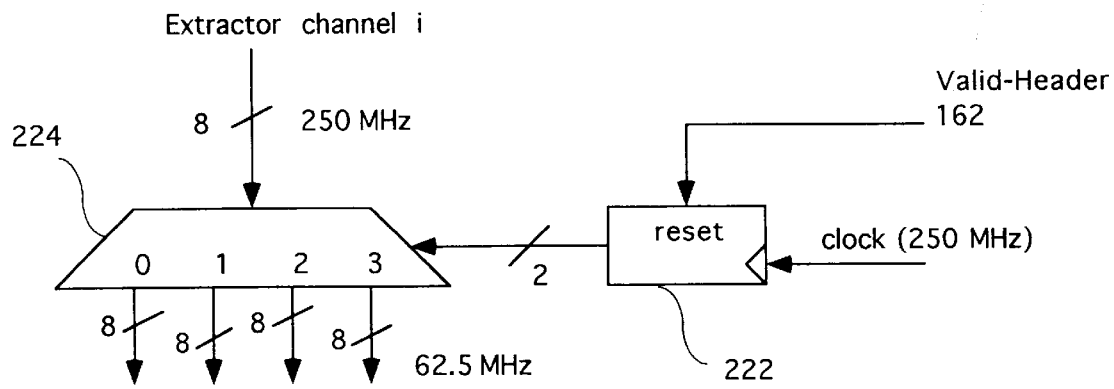
FIGS. 32(a)–(b) illustrate clock divider and multiplier circuits.
Figure 32B:
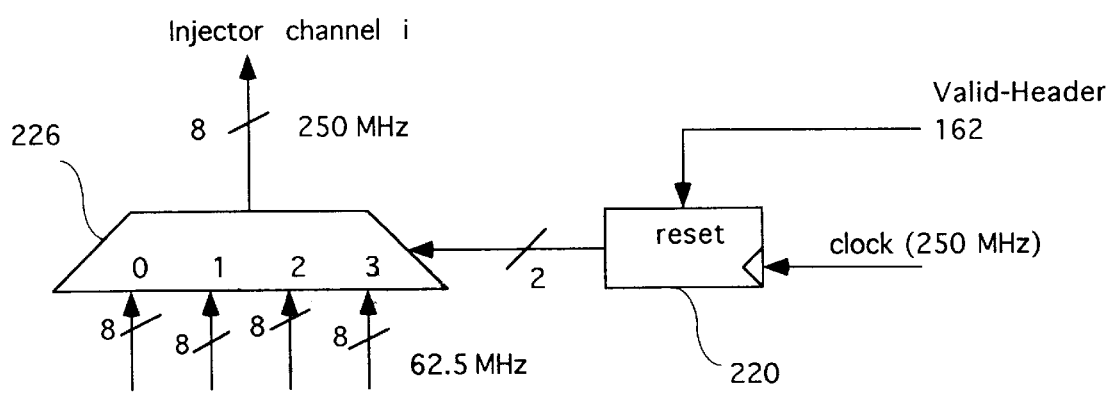

FIG. 32*a* illustrates a clock divider circuit 220 which is composed of a counter 222 and a demultiplexer 224. FIG. 32*b* illustrates a clock multiplier circuit consisting of the same types of components.

FIG. 33 illustrates one embodiment of the proposed packaged optoelectronic data processing and switching means. In FIG. 33, a typical packaged optoelectronic data processing and switching means or smart pixel array 40 contains a packaging means 300, the optical I/O channel 68 input means, the optical I/O channel 68 output means, the electrical injector channel 134 input means, the electrical extractor channel 114 output means, the injector-selector data switching means 130, the extractor-selector data switching means 110, optional data storage means 286, extractor-selector control signals 116 for controlling said extractor-selector data switching means, injector-selector control signals 136 for controlling said injector-selector data switching means, channel control unit data processing means 102 for generating said injector-selector and extractor-selector control signals 136 and 116, and control input means 78 for inputting control information bits including clock.

Operation of Invention

FIG. 9 illustrates an optical backplane where the smart pixel arrays 40 are mounted on the backplane PCBs. Plug-in modules insert data onto the optical backplane by supplying data to the injector channels (not shown) of their associated smart pixel array(s) 40 through the edge connectors 22 and the metal traces 28 on the backplane PCB 26. The plug-in modules receive data from the optical backplane by receiving data from the extractor channels (not shown) of their associated smart pixel array(s) 40 through the metal traces 28 on the backplane PCB 40. All metal traces have low capacitance and inductance because they are relatively short. The optical I/O channels 68 between smart pixel arrays 40 can be arranged in arbitrary patterns. For example, some optical I/O channels 68 can interconnect smart pixel arrays 40 in the horizontal axis and other optical I/O channels 68 can connect other smart pixel arrays 40 in the vertical axis (not shown), thereby providing a 2 dimensional optical interconnect which can span many square feet (i.e., 8 feet by 8 feet) of backplane PCBs (not shown). Such a 2 dimensional interconnect would allow the interconnection of hundreds of plug-in modules. In addition, some optical I/O channels 68 can optically interconnect smart pixel arrays 40 which are spaced apart a distance equal to that of many edge connectors 22. For example, if edge connectors are spaced 1 inch apart, optical I/O channels 68 can optically interconnect smart pixel arrays 40 which are perhaps 8 inches apart. For mechanical stability the backplane PCBs can be secured to a metal support structure.

FIG. 12 illustrates a typical IO specification of a packaged smart pixel array. The devices can be operated in two modes, "reconfigurable" and "intelligent". In the reconfigurable mode the data processing means on the smart pixel array is disabled, i.e., the smart pixel arrays do not process the data that they transport and hence there need not be any identification of the start or end of packets. Data to be transmitted is inserted over an injector channel 134 and appears shortly thereafter on one outgoing optical I/O channels 68 (which can be programmed by the user through control input signals 78). Data to be received arrives on an incoming optical I/O channel 68 and appears shortly thereafter on an extractor channel 114 (which can be programmed by the user through control input signals 78).

The plug-in modules 20 can operate with their own clock generators (not shown), or all plug in modules can be operated in synchronization with a global clock (not shown). In this case, the global clock can be distributed very effectively in the optical backplane with two counter-rotating rings. One plug-in module 20 acts as a master (not shown) and injects a clock onto one channel in each stream (i.e., the upstream 64 and downstream 66 optical data flows which are not shown) at a fixed clock rate. The channel must be programmed to be unbuffered (which will be described later). All other plug-in modules derive one clock from each stream. Plug-in modules derive one clock from the down stream (not shown) and use it to clock their upstream transmissions. This clock signal appears on smart pixel array IO port 69 on FIG. 12. The upstream nodes will always have safely latched their data before a down stream node starts the transmission of the next data, since the clock will always arrive to the upstream nodes before it arrives to the down stream nodes. Similarly for the other stream. Alternatively, a global clock could be distributed to all plug-in PCBs 20 over the backplane-PCB 26 over metals traces 28 with equal lengths (all not shown), and all backplane PCBs 26 can derive their clocks from a central clock generator (not shown) over fibers of equal length (not shown).

The basic structure of a smart pixel is shown in FIG. 13. Each pixel consists of optical input 82 and output 83 ports, a programmable delay circuit data storage means (optional) 84, an injector-selector cell 88 data switching means and an extractor-selector cell 86 data switching means as shown in FIG. 13. (The address-comparator circuit 94 data processing means is only used when the backplane is in the "intelligent" mode to be described shortly.) Each pixel 80 has four basic states, the "transparent", "transmitting", "receiving", and "transmitting-and-receiving" states as shown in FIG. 14. The pixels are arranged in a 2D array called a "slice" 100 as shown in FIG. 15 (only 4 channels are shown in FIG. 15). Each slice 100 is a self-contained module with optical IO channels and electronic IO channels with the following parameters: the slice has access to C optical channels (not shown), I injector channels (not shown) and E extractor channels (not shown), each with w=8 bit wide data paths (the parameter w can be chosen by the designer). The smart pixel array may contain S independent slices where S≧1 (not shown). The parameters (I,E,C,S,w) can be varied to adjust the ratio of electrical-to-optical bandwidth of the smart pixel array and to accommodate a range of VLSI technologies, IC packaging technologies and design goals.

FIG. 14 illustrates 4 basic states of an individual smart pixel 80. FIG. 14*a* illustrates a pixel in the "logically transparent" state. A bit of an incoming optical channel appears on the optical input port 82, is routed through the programmable delay circuit 84 to the injector-selector cell 88 and to an optical output port 83 which leads to a bit of an outgoing optical channel (not shown). FIG. 14*b* illustrates a pixel in the "transmitting" state. A bit of an incoming injector channel appears on port 92, is routed through the injector-selector cell 88 and to an optical output port 83 which leads to a bit of an outgoing optical channel (not shown). FIG. 14c illustrates a pixel in the "receiving" state. A bit of an incoming optical channel appears on the optical input port 82, is routed through the programmable delay circuit 84 to the extractor-selector cell where one 3-state buffer 122 drives the signal onto one bit of an extractor-channel 90. FIG. 14d illustrates a pixel in the "receiving-and-transmitting" state. A bit of an incoming optical channel appears on the optical input port 82, is routed through the programmable delay circuit 84 to the injector-selector cell 88 and to an optical output port 83 which leads to a bit of an outgoing optical channel (not shown). The same bit is also routed to the extractor-selector cell where one 3-state buffer 122 drives the signal onto one bit of an extractor-channel 90.

FIG. 15 illustrates a 2 dimensional array of pixels 80 called a slice 100. In FIG. 15 the slice 100 has 4 optical I/O channels, 3 electrical injector channels and 3 electrical extractor channels. The 4 most significant bits of each channel are shown. All pixels 80 in one channel are always in the same state. A slice has multiple optical incoming channels and multiple optical outgoing channels (not explicitly shown). The incoming optical data for one channel appears on the optical input ports 82 of all pixels in the channel. The outgoing optical data for one channel appears on the optical output ports 83 of all pixels in the channel. All the pixels in a channel are in the same state which is determined by the channel control unit 102. This unit broadcasts control signals 96 to all the pixels in a channel. Electrical data for the injector channels 92 is inserted in the top of the slice 100 and electrical data for the extractor channels 90 is removed from the bottom of the slice 100. (The channels need not be arranged as rows of pixels.)

There are four smart pixel array technologies that have been developed over the past 5 years. The FET-SEED technology described in D'Asaro, L. A., Chirovsky, L. M. F., Laskowski, E. J "Batch fabrication and operation of GaAs-AlxGal-xAs field-effect transistor-self-electrooptic effect device (FET-SEED) smart pixel arrays", *IEEE Journal of Quantum Electronics*, 29, pp. 670–7. The Epitaxial Lift Off technology is described in Camperi-Ginestet, B. Buchanan, S. Wilkinson, N. M. Jokerst, and M. A. Brooke, "Integration of InP-Based Thin Film Emitters and Detectors Onto a Single Silicon Circuit", in *Optical Computing*, Vol. 10, 1995 OSA Technical Digest Series (Optical Society of America, Washington D.C., 1995), pp. 145–7. The Hybrid Self Electrooptic Effect Device (SEED) technology is described in K. W. Goossen et al, "GaAs MQW modulators integrated with silicon CMOS," *IEEE Photonics Technology Letters*, Vol. 7, 1995, pp. 360–362. The VCSEL and Metal Semiconductor Metal (MSM) Photodetector technology is described in S. Matsuo et al, "Photonic switch monolithically integrating an MSM PD, MESFETs, and a vertical-cavity surface-emitting laser," *LEOS'94 Postdeadline Paper*, Boston, Mass., Oct. 31–Nov. 3, 1994, pp. PD2.1. All of these technologies use fairly standard semiconductor processing and are grown at the wafer scale. The smart pixel arrays are packaged in the same manner as VLSI IC chips and can be included on a PCB, MCM or any other type of IC mounting method. An additional technology (FET-SEED) is described in T. Cloonan, U.S. Pat. No. 5,289,303 "Chuted, Optical Packet Distribution Network", Feb. 22, 1994.

Using the Hybrid SEED smart pixel technology a 1×1 cm$^2$ VLSI die can currently support a 32×32 smart pixel array with approx. 1,024 optical IO and up to approx. 500 electrical IO pins. (The number of electrical IO pins is limited by conventional IC packaging technology.) At a clock rate of 250 Mbit/sec each smart pixel array has a peak optical bandwidth of 256 Gbit/sec and a peak electronic bandwidth of 48 Gbit/sec (assuming equal input and output bandwidths). The architecture of a smart pixel array which fits within these technology constraints is briefly summarized.

A typical smart pixel array for a reconfigurable intelligent optical interconnect may be designed to fit within a 1×1 cm VLSI die (not shown), which is considered a realistic target area. By allocating each pixel ≈300×300 μm (micro-meters), the die can contain ≈32×32 pixel array (not shown). These pixels can be divided into 8 slices (not shown), where each slice has 16 optical channels (each 8 bits wide). A typical IC package currently may contain at most approx. 500 IO pins, of which approx. 100 IO pins may be required for power and ground (and perhaps more). The remaining ≈400 electrical IO pins can be utilized by providing 3 injector channels and 3 extractor channels per slice (each 8 bits wide) times 8 slices for a total IO of 384 electronic pins (not shown).

Assuming an electrical clock rate of 250 Mbit/sec per electrical IO pin and 250 Mbit/sec per optical IO bit, this particular choice of parameters allows a single 1×1 cm smart pixel array with 48 Gigabits of electrical IO bandwidth the capability to "tap" an optical backplane with approx. 256 Gigabits of optical IO bandwidth (32×32 pixels times 250 Mbit/sec). By operating 4 smart pixel arrays per plug-in module PCB (not shown) the backplane will have a peak optical bandwidth of 1 Terabit/sec with each PCB having access to 192 Gigabits/sec. However, the smart pixel arrays may be designed with different ratios of electrical to optical IO bandwidth by adjusting the parameters I, E, C, S and w.

FIG. 16 illustrates an extractor-selector 110 data switching means. Data appearing on a selected subset of incoming optical channels 112 appear at the outgoing extractor channels 114 according to the extractor-selector control signals 116.

FIGS. 17a and b illustrate typical structures for extractor-selector cells 118. Extractor selector cells 118 can be composed of many one bit extractor selector cells 86 (not shown). In these particular cells there are 4 extractor channels. Optical data appearing on port 112 appears on one selected extractor channel 114 . Each cell has 4 extractor-selector control signals 116. One signal associated with each extractor channel; a '1' in any control signal causes the optical bit to appear on the extractor channel associated with that signal. Since the optical data will usually be written to one extractor channel, usually only one control signal 116 will be '1' and the rest will be '0's.

FIG. 18 illustrates an injector-selector 130 data switching means interfacing with multiple incoming optical channels 112, multiple outgoing optical channels 132 and multiple injector channels 134. The switching means is controlled by injector-selector control signals 136, and the unit can be (but is not necessarily) composed of multiple injector-selector cells 138. each of the injector-selector cells 118 can be composed of many one bit extractor selector cells 86 (not shown). Electrical data appearing on an injector channel 134 is caused to appear on one outgoing optical channel 132 according to the injector selector control signals 136. The injector-selector cells 88 are simply the 4-to-one multiplexers in each individual pixel 80 (not shown). Referring to FIGS. 13 and 14, these injector-selector cells receive their injector-selector control signals 136 from the bundle of control signals 96 from the channel control unit.

FIG. 19 illustrates a 1-of-n decoder 140 which enables the writing of control signals (not shown) which determine the state of a channel (not shown) into the channel control units (not shown). The control signals (not shown) can be loaded by allocating IO pins (not shown) which are reserved for providing only control signals. However, refering now to FIG. 15, in order to conserve IO pins it is desirable to multiplex control signals (not shown) onto injector-channel-0 240 and injector-channel-1 242 within each slice 100 to provide control while the "control-latch-enable" signal 72 from an external message-processor (MP) is asserted. When the signal "control-latch-enable" is asserted by the MP then injector-channel-0 240 supplies 8 control bits which are delivered the channel control units 102 and injector-channel-1 242 supplies 3 or 4 control bits which are used by the 1-of-n decoder 140 to select one output out of n, those outputs being the latch-enable signals 142 (which are not shown on FIG. 15 but are shown on FIG. 19). All x control latches in a slice can be loaded in x clock ticks or assertions on control-latch-enable 72 and all slices can be loaded simultaneously since they are independent units. At a clock rate of 250 Mbit/sec a complete reconfiguration will require 64 nsec. In usual mode of operation the SPA is reconfigured only once at initialization time or each time an embedding is changed.

FIG. 20 illustrates a typical structure of a programmable delay circuit 84 data storage means, which consists of a latch 144 and binary multiplexers 120 controlled by control signals 146. The unit accepts one bit from an incoming optical channel 148 and generates two outputs, one output 150 to the injector-selector (not shown) and one output 152 to the extractor-selector (not shown).

If the incoming optical data is to be buffered for 1 clock cycle before it appears on the extractor channel, then the lower multiplexer is set to forward the buffered signal from the latch 85 to its output 152, otherwise it forwards the unbuffered incoming optical bit 148 directly to its output 152. If the incoming optical data is to be buffered for 1 clock cycle before it appears on the outgoing optical channel (not shown), then the upper multiplexer is set to forward the buffered signal from the latch 85 to its output 150, otherwise it forwards the unbuffered incoming optical bit 148 directly to its output 152.

The programmable buffer circuit can significantly improve the efficiency of a high speed optical backplane. It may be desirable to operate the optical channels (not shown) in an unbuffered mode, i.e., so that the smart pixel arrays in the "transparent" state propagate optical data as soon as they receive it, to minimize propagation delays along the channels. However, a long unbuffered channel may lead to excessive skews between the different bits in a channel. In this case it is desirable to selectively set certain smart pixel arrays to be buffered, since buffering the optical data before propagating it down the channel will re-synchronize or re-align the bits in the channel. This selective buffering will enable much faster data transfers down the channels.

FIG. 21a illustrates a channel control unit (CCU) 102 data processing means for a reconfigurable optical interconnect. The CCU contains a control-latch 144 data storage means which is enabled to store control bits by a latch-enable control signal 142 coming from the 1-of-n decoder 140 (not shown). The control latch 144 stores extractor-selector control signals 116, injector-selector control signals 136 and other control signals 146 (for the programmable delay circuit 84 which is not shown and any other options). To load control signals into the control latch 144, the external message-processor (not shown) asserts the contol-latch-enable signal 143 shown on FIG. 19, which will cause one of the latch-enable signals 142 on FIG. 19 to be asserted. Refering back to FIG. 21, an asserted latch-enable control signal 142 will cause one control latch 144 to load control bits from injector-channel-0 240.

FIG. 21b illustrates a channel control unit (CCU) 102 data processing means for a reconfigurable intelligent optical interconnect. The CCU contains a control-latch 144 data storage means which is controlled by a latch-enable control signal 142 coming from the 1-of-n decoder 140 (not shown). The control latch 144 stores extractor-selector control signals 116, injector-selector control signals 136 and other control signals 146. The control latch 144 is loaded in the same manner as decsibed for FIG. 21a.

In FIG. 21b the channel control unit 102 also has an arbitration cell 154, a mode-multiplexer 156, and a synchronization unit 158. The synchronization unit interfaces to an address-comparator signal 160, a valid-header signal 162, a request signal (req0) 164, and an acknowledge signal (ack0) 166. The synchronization unit asserts a control signal req0 164 for an extractor channel (not shown) when the Valid-Header signal 162 is asserted and when the address-comparator signal 160 is asserted. The arbitration cell 154 responds to the request with an acknowledge signal ack0166. When signal ack0=0 the request has been denied; when signal ack0=1 then the request has been granted. The arbitration cell 154 also supplies the extractor-selector control bits from the arbitration cell 248. These signals 248 may be optionally latched in latch 250 when the Valid-Header signal falls (not shown). The extractor-selector control signals from the arbitration cell 248 are forwarded through the mode multiplexer 156 and delivered to all pixels in the channel through the bundle of control signals from channel control unit 96.

The mode-multiplexer 156 determines whether the channel is in "reconfigurable" mode or "intelligent" mode and its state is determined by a control bit 252 from the control latch 144. In the "reconfigurable" mode the mode multiplexer 156 selects the extractor selector control bits 116 from the control latch 144 and forwards these to all the pixels in the channel. In the intelligent mode, the mode multiplexer selects the extractor selector control bits from the arbitration cell 248 and forwards these to all the pixels in the channel through the bundle of control signals from channel control unit 96.

The external message-processor (not shown) can select the mode of the channels ("reconfigurable" or "intelligent") by writing the appropriate bits into the control latch 144.

FIG. 22 illustrates a typical synchronization circuit 158. In general this circuit generates the control signals requesting extractor channels req0 164 at the proper time and for the proper duration. In this case the circuit simply buffers the Valid-Header signal 162 and logically ANDs it with the Address-Comparator signal 160 thereby generating the request signal req0 164.

FIG. 23 illustrates a typical packet header data processing means for determining data to extract. To implement the intelligent optical interconnect, each channel in a slice (not shown) may process the bits in the packet header as the packet travels down the backplane and recognize packets to be extracted. To implement switching over the interconnect the bits in the packet header can represent destination PCB addresses, although they could represent other quantities to be described later. Let each PCB have a unique binary address and assume that all channels are 8 bits wide. If 5 bits in the packet header are reserved for the unique addresses than 32 distinct PCBs can be identified. (More bits can be allocated to allow more PCBs to be identified, and the packet header could occupy multiple bytes of a packet thereby providing multiple bits for processing.)

In order to be able to use a single batch fabricated smart pixel array, it is necessary that each smart pixel array can be informed of its unique address upon initialization, i.e., the unique address should not be stored in the VLSI mask. Each smart pixel array can receive a unique address from the associated external message-processor on a set of dedicated IO pins (not shown). However, to conserve IO pins it may be desirable to load the unique address bits into a latch bit-serially from a single IO pin. This latch will be called the "address-latch" 260 (not shown).

The bits representing a PCB address can be interpreted in many ways. In the simplest scheme, an address with integer value i is represented by $\log_2(i)$ bits. For example 5 bits can encode integer addresses 0 . . . 31. To perform address recognition, a channel in a slice 100 (not shown) must compare the 5 bits in the packet header with its unique 5 bit address which are stored in its address latch 260 (not shown). If these bits match then the packet is addressed to this PCB and the smart pixel array should extract the packet. To perform the address comparison each pixel has an address comparison circuit 94 as shown in FIG. 13. This circuit can be generalized to perfrom arbitrary forms of processing on the packet header and represents a data processing means associated with the smart pixel array.

Pixels should not confuse a valid packet header with regular data bits as these bits travel down the backplane. The intelligent optical interconnect can be operated in two modes, synchronous or asynchronous. In a synchronous system all packet headers can be injected at the same time. In this case a global control signal "Valid-Header" 162 can be distributed to all PCBs to inform them that packet headers can now be inserted onto the channels. This control signal and other control signals such as clocks can be extracted from the intelligent optical interconnect itself, as described earlier. (To miminize delays the programmable delay circuits 84 can be set to the unbuffered state while packet headers are on the channels.) In an asynchronous intelligent optical interconnect, PCBs may initiate packet insertions at any time. In this case each channel may be widened by 1 bit to include its own "Valid-Header" 162 control signal. This signal is asserted for each channel when that channel carries a valid header.

The remaining 3 bits in an 8-bit wide header can be designed to support various forms of broadcasting. For example, let the 5 least significant bits in positions 0 . . . 4 be used to denote a unique PCB address in the range 0 . . . 31. Bits 5 and 6 can be reserved for denoting broadcasts to selected subsets of PCBs and bit 7 can be reserved for denoting broadcasts to all PCBs. The eight address comparator cells 94 in FIG. 23 belong to a single channel. Pixels 0 . . . 4 perform bit by bit comparison between the 5 bits in the packet header 270 and the 5 address bits 272 in the address latch 260 (not shown). Pixels 5 and 6 could perform bit by bit comparison with a 2 bits of a "broadcast mask" 262 specified in the control-latch 144 for the channel (not shown) and 2 bits from the packet header 270. If bits 5 and 6 in the packet header match the 2 broadcast mask bits in the control latch then the channel will recognize itself as a destination and will attempt to extract the packet. If bit 7 in the packet header (the broadcast bit 280) is set then every PCB recognizes itself as a destination and will attempt to extract the packet.

Using this scheme, in addition to point-to-point interconnect a sending PCB can specify 4 subsets of destination PCBs it wishes to broadcast to. For example, PCB 0 may wish to broadcast to PCBs 1, 2 and 3 at one time, and may wish to broadcast to PCBs 4, 8 and 12 at other times, over channel 0. In this case, PCB 0 instructs PCBs 1, 2 and 3 to set the 2 broadcast mask bits 262 in their channel 0 control latch 144 (not shown) to '01', and it instructs PCBs 4,8 and 12 to set the 2 broadcast mask bits 262 in their channel 0 control-latch 144 to '10', using the regular point-to-point communication mechanisms between the PCBs. These PCBs then set their broadcast mask bits by writing to their channel 0 control-latch using the procedure outlines earlier (which does not affect the control-latch settings for the other channels). Thereafter, PCB 0 can broadcast to PCBs 1,2 and 3 over channel 0 by specifying '01' in bits 6 and 7 of the packet header and it can broadcast to PCBs 4, 8 and 12 by specifying '10' in bits 6 and 7 of the header. The receivers will recognize these addresses since they will match their broadcast mask bits 262. These broadcast mask 262 settings are unique to channel 0 in the slice (not shown). Hence, every sender can create its own customized community of receivers for broadcasts. (The default settings for the 2 broadcast bits are '00' since the control-latch is cleared on power-up).

Other data processing means are possible for determining packets to extract and will be discussed later.

FIG. 24 illustrates various smart pixel array organizations with varying ratios of electrical and optical bandwidth. FIG. 24a illustrates a smart pixel array 40 with one slice S=1, with one electrical injector channel I=1, one electrical extractor channel E=1, and several optical channels C=16. FIG. 24f illustrates a smart pixel array 40 with several slices S=1, each with one electrical injector channel I=1, one electrical extractor channel E=1, and one optical channel C=1.

FIG. 25 illustrates various physical layer topologies between PCBs in an optical backplane. FIG. (a) denotes a circular optical backplane (called a "HyperPlane") with 2 streams, an upstream optical data flow 64 and a down stream optical data flow 66. The streams have a long distance optical datapath 186 due to the wrap around from one end to the other. FIG. (b) illustrates a single stream (the upstream optical data path 64) where the long distance optical datapath 186 has been eliminated. Numerous other physical layer topologies are possible.

FIG. 26 illustrates an embedding of the 3D mesh of a 512 processor Cray T3D into the optical interconnect with two streams. Each inter-processor channel has 2 bytes of data and one byte of control in each direction, clocked at 150 Mbit/sec for a channel data bandwidth of 2.4 Gbit/sec. A 8×8×8 mesh corresponding to the 512 processor Cray T3D data-paths can be embedded into the circular optical backplane (called the cicular hyperplane) with two streams, the upstream 64 and down stream 66 optical data flow as shown in FIG. 26. Let each PCB support 16 processors (which is achievable using advanced PCB and MCM technology). The 8×8×8 3D mesh can be contracted to a smaller 2D mesh where the 16 processors on a PCB are viewed as one node in a 2D mesh. 16 processors in each 8×8 plane can be grouped together (or "contracted") to yield a single node. The 8×8 plane will be contracted to yield a 4 node ring. Hence the (8×8)×8 3D mesh can be contracted to yield a (4)×8 2D mesh where the edges now have a capacity of 16 channels each 3 bytes wide (2 bytes for data and one byte for control). The embedding of this 4×8 2D mesh into a circular hyperplane with 32 PCBs is shown in FIG. 26. In FIG. 26 each bold line represents an optical channel connection 74 which is 24 bytes wide. The embedding has a height of 10 horizontal lines, equivalently the embedding requires 10*24=240 byte-wide channels in each direction. Assuming 2 smart pixel arrays of the design described earlier per PCB per ring in each direction, the optical interconnect supports 256 byte-wide channels in each direction. Hence, the optical interconnect has a sufficient number of byte wide channels to embed the 512 processor Cray T3D supercomputer interconnect, including all data paths and control paths. Finally, the optical interconnect uses only 4 smart pixel arrays per PCB times 32 PCBs for a total of 128 Hybrid-SEED smart pixel arrays, a small number. Embeddings of other graphs are also possible.

It is worth pointing out that the use of two optical datapath rings in opposite directions (the upstream and downstream) results in a more efficient embeddings than are possible when using only a single ring. For example, if only a single ring (the upstream ring) was available, the embedding in FIG. 26 would require more optical channels.

FIGS. 27–29 illustrate the arbitration circuit 200 for a synchronous intelligent optical interconnect. The arbitration circuit 200 performs the allocation of extractor channels 114 to competing requests—it examines the request bits from all the channels in a slice and allocates the available extractor channels to the requesting channels. The arbitration unit can be synchronous or asynchronous. A synchronous unit will receive all the requests at the same time. An asynchronous unit may receive new requests for extractor channels at different times and may receive cancellations of existing requests at different times.

A synchronous arbitration unit is a large but regular circuit. In FIG. 27 each channel i in a slice generates one input to the arbitration unit called "Req i" 164. Each channel receives 3 extractor-selector control bits 116 and an acknowledge bit "Ack i" 166. When Ack i=1 then the request i has been granted. The arbitration circuit can be constructed from an array of identical arbitration cells 202 which communicate with internal control signals 206. In a circular optical backplane the Ack i signal can optionally be inserted back into the least significant bit of packet header (circuitry not shown) for transmission back to the sender. In this manner, when the header reappears at the sender, the sender can examine the least significant bit of the header to determine if an extractor channel was allocated to the receiver (circuitry not shown).

In a synchronous arbitration circuit the extractor-selector control bits 116 returned to channel i are always equal to "rank (i)" where rank(i) is defined as rank(i)=req0+req1+ . . . +req(i−1), i.e., rank(i) is the sum of the control signals req(0) up until req(i−1). Refering to FIG. 28, a simple way to generate the extractor-selector control bits is to have a series of adders 206, one per arbitration cell 202, which add the current req signal 164 to the count on the input side 282 and generate a new count which appears on the output side 284. This circuit can be simplified to have lower gate delays by arranging the adders in the form which resembles a binary tree, and other realizations of an arbitration circuit are possible. In FIG. 28, decoder 212 is used to convert the count control signals to extractor-selector control signals 116.

The asynchronous arbitration circuit (not shown) is slightly more intricate but readily constructed. In one prefered embodiment (not shown), the asynchronous arbitration circuit retains a busy-bit for each extractor channel. In each clock tick some extractors may be already busy, some new requests may arrive, and some existing requests may be freed, releasing the extractors. Hence, in each clock tick the asynchronous arbitration circuit can allocate idle extractor channels by examining its busy bits. A busy-bit=0 denotes an idle extractor channel which can be allocated causing the busy-bit to become 1. The arbitration circuit can release busy extractor channels in response to a release signal or a falling request signal by resetting the appropriate busy bits, thereby freeing the extractor channel.

In an asynchronous optical backplane (not shown) it is desirable to add 1 or 2 bits of optical control to each channel. One bit of control is the "Valid-Header" signal 162 which signifies when a packet header is on the channel i.e., to distinguish from data or an idle channel (not shown). The synchronization unit 158 (not shown) processes this bit to determine when the address comparator control signal 160 is valid. The optional second bit is the sender's bit-clock which the receiver can use to control its reception when the channel is latching its data—this high speed clocking scheme is called "source synchronous uncompelled" in the literature, i.e., in J. Di Giacom, "Digital Bus Handbook", McGraw Hill. (Alternatively, a global clock can be broadcasted to all PCBs through the backplane itself to notify receivers when to latch the data.)

In an asynchronous optical backplane the receiving channel should release the extractor channel it was allocated (not shown). At the end of a packet the sender can assert the Valid-Header 162 signal with its own PCB address or an invalid PCB address, which will cause the receiver to release its claim on the extractor channel (not shown).

In a broadcast environment it is possible that too many senders may attempt to communicate with a receiver simultaneously, leading to contention for extractor channels. A sender can be notified of contention at the destination through an acknowledge bit 166 which can be transmitted back to the sender in the packet header over the circular backplane. Alternatively a separate control channel can be embedded in the optical backplane where each bit in the control channel denotes the acknowledge for a particular channel. When contention occurs at the receiver a sender may decide to keep its request asserted until it gets a positive acknowledge, thereby providing a simple form of contention control (circuitry not shown).

Advanced Processing for Intelligent Backplanes and Systems

The functionality of an intelligent photonic backplane can be enhanced by providing more advanced processing capabilities on a smart pixel array. Typical advanced processing capabilities are described without reference to figures.

Multi-Point Photonic Switching: To enable multipoint photonic switching the packet header may consists of 2 fields, the "mask" and "destination" fields, where a 0 in a mask bit implies a logical don't care for that bit position. The smart pixel array has a unique Address. This functionality enables multipoint switching to a wide range of selected subsets. The extraction is attempted when the "Extract" variable shown below is asserted. The processing requires ≈an EXOR, OR and AND gate per pair of pixels or more (assuming the mask and destination bits appear on separate pixels) as shown;

$$\text{L-bit Mask} = m_{L-1} \cdots m_0$$

$$\text{L-bit Address} = a_{L-1} \cdots a_0$$

$$\text{L-bit Destination} = d_{L-1} \cdots d_0$$

$$\text{Extract} = Not\{m_{L-1} \cdot (a_{L-1} \oplus d_{L-1}) + \cdots + m_0 \cdot (a_0 \oplus d_0)\}$$

Sorting: Smart pixel arrays which detect inclusion within a range, where the ranges are integers or floating point numbers, can be used in an intelligent backplane which performs distributed sorting efficiently. The packet header may consist of one field denoting an integer or floating point number called the "key". Each smart pixel array is supplied with two "bounds" from the MP. The criteria for extraction may be inclusion or exclusion of the key within the lower and upper bounds or various others as shown below. To support numbers greater than 8 bits wide the comparisons may occur over multiple clock cycles (or over multiple channels). This mode will require additional data storage means on the die to store the larger numbers. The channel control unit will also require a small finite state machine which keeps track of the current status of the comparison. Smart pixel arrays which determine the minimum or maximum from all keys are also very useful. To find the maximum a smart pixel array could examine the data on an incoming optical channel and incoming electrical channel and propagate the larger value out onto the outgoing optical channel. After being processed by all smart pixel arrays, the channel will have the maximum value. This form of header processing requires ≈12 binary gates per pixel or more as shown:

L-bit Lower Bound = $M_{L-1} \cdots M_0$

L-bit Upper Bound = $N_{L-1} \cdots N_0$

L-bit Key = $k_{L-1} \cdots k_0$

Extract = $(Key \geq M) \cdot (Key \leq N)$

Extract = $Not((Key \geq M)) + Not((Key \leq N))$

Extract = $(Key \geq M)$

Extract = $(Key \leq N)$

Parallel Prefix: A "parallel prefix" operation is a well known in parallel computing, i.e., synchronization and resource assignment. For example, see K. Hwang, "Advanced Computer Architecture: Parallelism, Scalability, Programmability", McGraw-Hill, 1993. Let each node represent a plug-in module 20 with an associated smart pixel array 40. Let each node i have a key $k_i$. After the parallel prefix each node i contains $k_0 + \ldots + k_i$ (The addition can be replaced with any associative operator including logical AND or OR). To implement the parallel prefix each smart pixel array i may operate on the keys broadcasted by PCBs 0 ... i-1, compute the running sum (i.e., the rank) and report the rank to its message-processor (MP). Alternatively each array may operate upon its own key and an incoming rank received on an optical channel, and report its rank to its MP and simultaneously forward it to the next PCB over an optical channel. Parallel prefix computations occur frequently and are often "hard-wired" into parallel computing machines to execute faster.

Synchronization is one example of a parallel prefix. Typically when a processor finishes executing a sub-task it sets a "finished" bit. The completion of all processors working on a global task is determined by a logical AND of all these bits. Since the logical AND is an associative operator this synchronization scheme is one instance of a parallel-prefix. The intelligent optical backplane can perform this form of parallel prefix by having a smart pixel array perform a logical AND on specified bit in an optical control channel to determine its rank using a data processing means, which is then forwarded to its MP and propagated down the backplane over an optical channel.

The completion of the first processor working on a global task can be determined by a logical OR of all these "finished" bits. Since the logical OR is an associative operator this synchronization scheme is another instance of a parallel-prefix. The intelligent optical backplane can perform this form of parallel prefix by having a smart pixel array perform a logical OR on a specified bit in a control channel to determine its rank using a data processing means, which is then forwarded to its MP and propagated down the backplane.

The parallel prefix operation can also be used to provide arbitration for resources over all PCBs in the backplane. Each PCB with a request for a resource generates a request bit as its key. The backplane performs a parallel prefix which performs an addition of the incoming rank with the current key to generate a new rank, which is then forwarded to the MP and also propagated down the backplane. If there are J resources to be allocated then each PCB with rank≦J can be assigned the resource identified by its rank; the PCBs with higher ranks lose out in the contention process and must wait for another arbitration cycle. It is possible to allocate access to the channels in the backplane itself using the parallel prefix operation, i.e., the backplane can be treated as 8 logical channels each 128 bits wide and access to the 8 logical channels can be arbitrated by a control channel which is performing a parallel prefix. Parallel prefix based on addition of a running sum with a key will require a full-adder (approx. 12 logic gates) or more in each pixel.

Pattern Matching: Functional memory systems such as the Content Addressable Memories (CAM) allow the pre-processing of data before it is extracted from a dense VLSI memory. The Content Addressable Memory is described in K. Tamaru, "The Trend of Functional Memory Development", IEICE Trans. Electron., Vol. E76 C, Nov. 1993. Smart pixel arrays which perform pattern matching over terabits of data per second may enable new models for distributed data caches, content-addressable-memories, data-flow architectures and parallel database systems. The VLSI CAM memory provides storage and retrieval with limited I/O bandwidth and with dense processing capabilities (perhaps many thousand of comparisons within a single CAM IC). Smart pixel arrays generally provide a very large optical I/O and processing bandwidth with comparisons occurring within the IC. Hence, the smart pixel arrays may find applications as "intelligent gateways" which perform transportation, processing and selection of search keys at terabit aggregate rates, leading to further processing on the processing boards.

Let each smart pixel array store i patterns and each packet header contain one or more search keys. The channels may perform bit-by-bit comparisons with the search keys in the packet headers and many patterns stored in (or provided to) the smart pixel array in parallel and packets can be extracted according to a number of different criteria as shown below (note that Ind(v,b)=1 if Hamming_Distance(v,0)≧b and that Θ denotes a logical function). To allow the processing of long search keys the comparison may span multiple clock cycles, in which case the CCU must contain a small finite state machine which keeps track of the status of the comparison. The functionality can be enhanced by associating a bit-mask for each search key, where the comparators only perfrom the logic functions on the bit positions specified by a non-zero mask bit as described before. This form of processing requires ≈between 6 and 6i gates per pixel or more depending on the number of patterns stored in a smart pixel array, as shown:

L-bit Pattern$_i$ = $p_{L-1,i} \cdots p_{0,i}$

L-bit Mask = $m_{L-1} \cdots m_0$

L-bit Key = $d_{L-1} \cdots d_0$

Extract = $\max\{(m_{L-1} \cdot (p_{L-1,i} \Theta d_{L-1})) + \cdots + (m_0 \cdot (p_{0,i} \Theta d_0))\}$ Extract = $Ind(\{(m_{L-1} \cdot (p_{L-1,i} \Theta d_{L-1})) + \cdots + (m_0 \cdot (p_{0,i} \Theta d_0))\}, b)$ The pattern matching concept can be extended by computing the Hamming Distances between the search keys and patterns (according to the bits specified in a mask field) and extracting the data if a threshold is exceeded as shown above (where Θ now denotes logical EXOR). Packets with search keys which match in b or more bits meet the threshold criterion and are extracted for further off-chip processing. One may design a terabit content addressable memory distributed over multiple PCBs where the strict match criterion of conventional CAMs is replaced by an exact or near match based upon Hamming distance. The pattern matching processing may find applications in parallel database systems and fuzzy logic inference systems.

Snoopy Caches: A number of basic functions for parallel processing can be implemented within the intelligent backplane. Parallel processing based on shared memory schemes often rely on "snoopy" caches. Snoopy caches are described in J. L. Hennessy and D. A. Patterson, "Computer Architecture: A Quantitative Approach", Beta version, Morgan Kauffman, 1995. Since the intelligent backplane can support multiple broadcast channels then snoopy caching can be directly supported. When a processor changes a cached shared variable it broadcasts the change to all other processors, who invalidate their cache entries or update their caches.

Channel Control: Communication channels are often provided with hardware support for basic functions such as buffering, flow control, congestion control, error control, media access control and acknowledgment. Many parallel computer networks also provide hardware support for these basic functions and additional basic functions used primarily in computing. For example see K. Hwang, "Advanced Computer Architecture: Parallelism, Scalability, Programmability", McGraw-Hill, 1993. These basic functions may vary between machines and applications. Control signals for these basic functions can be transported over the optical backplane by statically embedding optical control channels for this purpose. Additional hardware support for basic functions can also be supplied within the smart pixel arrays themselves. For example, the intelligent backplane provides hardware acknowledgment of successful packet transmissions, which can also be used to provide a back-pressure flow control mechanism (i.e., a sender is suspended until a positive acknowledge is received). If the transistor densities are sufficiently large in the future then entire functions may be relegated to the smart pixel arrays.

Clock Dividers: Packaged smart pixel arrays based upon VCSEL arrays and MSM photodetector arrays are expected to have optical clock rates in the Gbit/sec range. Each VCSEL can typically generate 10 mW of optical power per signal which will facilitate very high speed communication between 2 smart pixel arrays in the proposed design. Smart pixel arrays may include buffering data storage means 286 shown in FIG. 33 and Time Division Multiplexing (TDM) external electronic circuits with a slower electronic clock rate to slow down optical the clock rate when interfacing to the external electronic circuits with a slower electronic clock rate. For example, individual bytes received on an optical channel at a clock rate of 250 MegaHertz (Mhz) can be parallelized to yield 4 bytes at a clock rate of 62.5 Mhz as shown in FIG. 32. Serial data (i.e., bytes) being received on an extractor channel (at the top) at a clock rate of 250 Mhz enters a demultiplexer 224 where it is parallelized to a 4 byte wide datapath with a clock rate of 62.5 Mhz for interfacing to the electrical extractor channel output ports (not shown). Similarly, the parallel bytes entering an electronic injector channel input port over a 4 byte wide datapath with a clock rate of 62.5 Mhz are serialized to supply bytes at 250 Mhz using a multiplexer 226. Small counters 220 provide the processing to perform the clock division. By including clock dividers this scheme will enable the packaged smart pixel array which can be optically clocked at potentially a few Ghz to be used in a much larger range of applications and technologies which are electrically clocked at typically a hundred Mhz, since they will not require expensive high speed devices for interfacing with slow electronics. This scheme will require additional electronic IO pins, increasing the ratio of optical to electronic bandwidth.

A Broadcast-Based Photonic System Supporting 32 PCBs

FIG. 30 illustrates a typical embedding of a multiple channel broadcast switch into the reconfigurable intelligent optical interconnect. Let the intelligent interconnect support 32 PCBs with each PCB having 4 smart pixel arrays arranged in a circular optical datapath, with a optical clock rate of 250 Mhz. According to earlier discussion, let each smart pixel array support 128 optical byte-wide IO channels, 24 byte-wide injector channels and 24 byte-wide extractor channels (all not shown), where each channel has a bandwidth of 250×8=2 Gbit/sec. Each smart pixel array provides access to 24 selected optical channels. With 4 smart pixel arrays per PCB each PCB has access to a subset of at most 96 out of 512 optical I/O channels.

Suppose each PCB supports 8 computing elements which generate traffic at the high-end bit rate of roughly 3.2 Gbit/sec each. (According to Hennessy and Patterson referenced earlier, a 200 Mhz DEC-Alpha or the MIPS R4000 processor may generate an external memory reference every 40 nanoseconds or so. If each external reference yields a 128 bit result then each microprocessor generates and consumes data from the intelligent interconnect at a rate of roughly 3.2 Gbits/sec.) With 8 computing elements per PCB, each PCB is generating and receiving data at a rate of roughly 25.6 Gbit/sec. (The decision to place 8 processors per PCB is arbitrary. With advances in MCM technology the trend is towards 8 or 16 processors per PCB.)

The reconfigurable intelligent optical interconnect can be configured by allocating a reserved optical broadcast channel for each processor. To send a message to another processor or group of processors the sender simply broadcasts the message over its reserved channel with the appropriate addressing information in the packet header as described earlier. (Alternatively each processor could have its own reserved optical channel for receiving data, where all processors wishing to communicate with this processor must transmit over its receiving channel). Since there are 32×8= 256 processors in the system and 512 byte-wide channels in the interconnect then each processor can reserve two byte-wide optical channels, thereby reserving 4 Gbits/sec of IO bandwidth. A processor will never face contention when accessing its own channels since they are reserved. FIG. 30 is representative of this scheme. The smart pixel arrays on each PCB 20 provide multiple injection points 70 over selected optical channels which are the reserved broadcast channels. In FIG. 30 each PCB 20 is shown with 4 injection points, where each injection point represents connections between many electronic injector channels and many optical channels (since drawing every individal connection would be too cluttered). Observe that no other PCBs 20 broadcast over the same optical channels (as there are no injection points 70 onto the same optical channels).

Each smart pixel array is processing data travelling down all the broadcast channels passing through it. This is illustrated since the intersection of every (horizontal) optical channel and every (vertical) extractor channel contains a clear circle which represents a potential extraction point 72. Again, each extraction point represents a potential connection between multiple optical channels (horizontal) and multiple electronic extraction channels (vertical). Hence a transmission from one smart pixel array will be processed by all other smart pixel arrays and mesages will be extracted by selected smart pixel arrays.

FIG. 31 illustrates the probability a packet will be blocked at the receiving smart pixel array due to contention for electrical extraction channels. (An analytic model was developed to compute this blocking probability.) A packet transmission over the intelligent interconnect can face contention at the receiving smart pixel array if too many other packets simultaneously attempt to communicate with the same destination smart pixel array. In this case there will be too many requests for extractor channels, some of which will not be serviced. For example, consider a slice with 16 optical channels and 3 extractor channels. If more than 3 requests for extraction channels arrive simultaneously, only 3 requests will be serviced and the others will be denied access to extraction channels (which is called "blocking"). The sender can be notified of contention at the destination through the acknowledge bit in the returning header. When blocking is encountered a sender can attempt a re-transmission at the next packet time slot.

FIG. 31a illustrates the blocking in a smart pixel array with a single slice with one injector channel and access to 64 optical channels. The number of extractor channels varies from 1 to 8. As the number of extractor channels increases the blocking probability drops significantly. For 8 extractor channels (E=8) the blocking probability is approx. $10^{-8}$ at an offered load of 0.5. (The offered load is the probability an optical channel is carrying a packet during each packet time slot.)

FIG. 31b illustrates the blocking in a smart pixel array with a single slice with four injector channels and access to 64 optical channels. The number of extractor channels varies from 1 to 8. The blocking probability is higher for this system compared with FIG. 31a since there are more injector channels competing for access to the same number of extractor channels.

FIG. 31c illustrates the blocking in a smart pixel array with four slices where each slice has one injector channel and access to 64/4=16 optical channels (i.e., each slice is smaller, less costly and faster). The number of extractor channels per slice varies from 1 to 8. The blocking probability is much lower for this system compared with FIG. 31a and FIG. 31b since there are many more extractor channels available, i.e., each slice now only arbitrates requests for extractor channels from 16 optical channels and each slice as its own extractor channels. For 4 extractor channels per slice (E=4) the blocking probability is approx. $10^{-7}$ at an offered load of 0.5.

The use of multiple smaller slices rather than a single large slice can improve the overall system performance. The use of multiple slices keeps each slice small, so that the hardware complexity of the injector-selector circuit (not shown) and extractor-selector circuits (not shown) is less. For example, a smart pixel array with a single slice with 128 optical channels and a 8 injector channels and 8 extractor channels is more complicated and costly in hardware than a smart pixel array with 8 slices, with 128/8=16 optical channels per slice and with 1 injector and 1 extractor per slice. Both these cases have the same ratio of electronic-to-optical bandwidth, but the latter design with multiple slices is simpler to implement in hardware. The difference in hardware can be estimated by considering the complexity of each injector selector cell 88 and each extractor selector cell 86 that would be required (both not shown).

In addition, larger slices will require proportionally more time to determine their state. A large slice must arbitrate over a large number of requests which will take more time. If the combinational logic delays in an arbitration circuit are large then it will be desirable to let the logic settle for multiple clock cycles, which can be achieved by having the Valid-Header control signal 162 asserted for a longer duration. For example, at a clock rate of 250 Mbit/sec, each clock tick has 4 nanoseconds duration. A large slice with 128 optical channel may require 4 clock cycles to perform the arbitration whereas a small slice with 16 optical channels may perform the arbitration in 1 clock cycle. In this case, the use of smaller slices will save 3 clock cycles which can be used to transmit data. Suppose the channels are configured to be very wide (i.e., 64 bit-wide channels can be achieved by operating for example 8 byte-wide channels in parallel). The increase in efficiency from using smaller slices is apparent. The smaller and faster slices can transmit 3 times 128 bits of data=384 bits while the larger slice is completing its arbitration process. Hence, multiple with fewer channels are usually prefered over a single larger slice with more channels since they require less hardware and they are faster.

FIG. 33 illustrates one embodiment of the proposed optoelectronic data processing and switching means (smart pixel array) with all major modules visible.

Use of Fiber Image Transmission means

One dimensional fiber ribbons consist of an array of fibers in a single ribbon-like stucture. One dimensional fiber ribbons are commercially available from Motorola Inc., Chandler Ariz. 85248, USA. The use of 1 dimesional arrays of fiber to transmit optical images is now well established. The use of 2 dimensional fiber arrays to transmit optical images is described in R. A. Novotny, "Parallel Optical data Links using VCSELs", Proc. SPIE Vol 2147, 1994. Two dimensional fiber arrays were constructed by aligning 1 dimensional fiber ribbons into a support structure and cementing them in place. Two dimensional fiber arrays are often used to transmit optical images. In FIG. 3, taken from the prior art T. Cloonan, U.S. Pat. No. 5,289,303 "Chuted, Optical Packet Distribution Network", Feb. 22 1994, two dimensional fiber arrays 44 are used to deliver optical images and remove optical images from devices.

Different forms of optical imaging have been described in Y. Li et al., "Applications of Fiber Image Guides to Bit-Parallel Optical Interconnections", Proceedings of the International Conference on Optical Computing, March 13–15, 1995, and references contained therein. The proper transmission of images over the types of fiber bundles used in medical applications was demonstrated. In particular, the output from a VCSEL array was injected into a commercially available 0.5 mm diameter fiber bundle which contained approx. 6,000 individual fibers (the type of fiber used in medical endoscopes for internal observation) The image was very clearly received at the receiving end, with very low crosstalk between adjacent optical channels. Such high density fiber bundles are commercially available from medical imaging equipment manufacturers. The development of super high density packed image guides is also described in M. Mogi and K. Yoshimura, "Development of super high density packed image guide", Proc. SPIE, Vol. 1067, pp. 172–180, 1989.

Two dimensional fiber arrays and fiber bundles used in medical imaging systems can also be used to transport optical images between the proposed smart pixel arrays. Refering to FIG. 33, one end of a fiber bundle can be placed over the optical channel output means (i.e., a VCSEL array) and the other end placed over the optical channel input means (i.e., a photodetector array) of a remote smart pixel array, thereby providing the means to transport the optical images from one device to another over fiber. (A lense or microlense array may be used to focus the beams from the VCSEL array into the fiber bundle as described in Li et al.).

By using fiber imaging techniques, multiple modules which are spaced meters apart can communicate using the proposed intelligent optical interconnect over flexible fiber bundles as the physical transmission medium. Hence, the proposed smart pixel arrays can be used to create a reconfigurable intelligent optical interconnect in the form of a "Local Area Network" which connects modules which are distributed over small areas.

Conclusion, Ramification and Scope of Invention

While the above description contains many specifications, these should not be construed as limitations on the scope of the invention, but rather as an exemplification of one preferred embodiment thereof. It is to be understood that the above-described embodiments are merely illustrative of the principles of the invention and that many variations may be devised by those skilled in the art without departing from the spirit and scope of the invention. For example, although the smart pixel arrays have often been described in an intelligent optical backplane, other physical topologies such as fiber-based local area networks are possible.

While the channels have often been described as 8 bits wide, the channels may also be 1 bit wide or 128 bits wide. While the Hybrid-SEEd smart pixel arrays are integrated devices consisting of a CMOS substrate with GaAs optical IO solder bump bonded onto the emitting surface, other embodiments of a packaged smart pixel array are possible, i.e., as a multichip module with a monolithic VCSEL array, a monolithic MSM photodetector array, and a silicon CMOS substrate for data processing.

It is therefore intended that such variations be included within the scope of the invention.

We claim:

1. A packaged opto-electronic data switching means comprising a plurality of optical channel input means, each comprising an optical-to-electronic signal converter for conversion of optical signals received at said optical channel input means to corresponding electrical signals;

a plurality of optical channel output means, each comprising an electrical-to-optical signal converter for conversion of electrical signals received at said optical channel output means into corresponding optical signals;

an electrical injector channel input means;

an electrical extractor channel output means;

control input means for inputting control signals;

an extractor-selector data switching means operably connected to said optical channel input means and said electrical extractor channel output means, said extractor-selector data switching means to receive electrical signals from said optical channel input means and switch a subset of said received electrical signals to said electrical extractor channel output means responsive to control signals;

an injector-selector data switching means operably connected to said electrical injector channel input means, and said optical channel output means, for switching electrical signals from said optical channel input means and said electrical channel input means, to said optical channel output means in response to control signals;

a mechanical substrate comprising a plurality of electrical conductors, wherein said extractor-selector data switching means is interconnected to said optical channel input means and said electrical extractor channel output means by way of electrical conductors on said substrate, and said injector-selector data switching means is connected to said electrical injector channel input means, and said optical channel output means by way electrical conductors on said substrate;

and a packaging means suitable for mounting said opto-electronic data switching means onto a substantially larger processing module, said packaging means packaging said optical channel input means, said output channel output means, said control input means, said electrical injector-channel input means, said electrical extractor-channel output means, said injector-selector data switching means, said extractor-selector data switching means and said substrate, thereby providing a packaged opto-electronic data switching means which supports controllable switching of data received on incoming electronic injector channel at said electronic injector channel input means onto outgoing optical channels at said plurality of optical channel output means and controllable switching of data received on incoming optical channels at said plurality of optical channel input means onto outgoing electrical extractor channel at said electrical extractor channel output means.

2. The packaged opto-electronic data switching means of claim 1, further comprising a data processing means operably connected to said control input means, said extractor-selector data switching means and at least one of said plurality of optical channel input means, said data processing means operable to receive data from said optical channel input means, process said data and generate control signals for controlling said extractor-selector data switching means.

3. The packaged opto-electronic data switching means of claim 2 further comprising a second data processing means operably connected to said optical channel input means and injector-selector data switching means, said second data processing means operable to process data received on at least one of said plurality of optical channel input means and modify said data, whereby said injector-selector data switching means switches modified values of said data onto at least one of said plurality of optical channel output means.

4. The packaged opto-electronic data switching means of claim 2 wherein said data processing means processes packets of data received on at least one of said optical channel input means by performing any series of boolean logic operations involving bits from packet and bits from a control bit pattern and generates control signals for said extractor-selector data switching means to extract selected packets based on said processing.

5. The packaged opto-electronic data switching means of claim 2 wherein said data processing means comprises silicon substrate based processing means and at least one of said plurality of optical channel output means comprises at least one of a Self-Electro Optical Device (SEED) and a Vertical Cavity (VCSEL) electrical-to-optical signal converter.

6. The packaged opto-electronic data switching means of claim 1, further comprising data storage means operably connected to said plurality of optical channel input means, for buffering electrical signals from said plurality of optical channel input means.

7. The packaged opto-electronic data switching means of claim 1, further comprising
- a first data storage means operably connected to said optical channel input means for storing data received on said optical channel input means responsive to control signals,
- a second data storage means operably connected to said electrical injector channel input means for storing data received on said electrical injector channel input means responsive to control signals,
- a data processing means operably connected to at least one of said first and second data storage means, responsive to control signals for generating control signals for at least one of said first and second data storage means.

8. The packaged opto-electronic data switching means of claim 7 wherein
- said optical channel input and output means are clocked at an optical clock rate,
- said electrical channel input and output means are clocked at first and second electrical clock rates, respectively,
- wherein optical clock rate exceeds both first and second electrical clock rates.

9. The packaged opto-electronic data switching means of claim 1 wherein said substrate further comprises a multi-chip module substrate.

10. A processing system comprising: a plurality of packaged opto-electronic data switching means as claimed in claim 1;
- a plurality of processing modules each operably connected to at least one of said packaged opto-electronic data switching means,
- a plurality of optical imaging means, each one coupling one of said opto-electronic data switching means to another one of said opto-electronic data switching means, so that optical signals from an optical channel output means of at least one of said packaged opto-electronic data switching means is imaged onto optical channel input means of another one of said packaged opto-electronic data switching means,
- thereby establishing controllable optical communication channels between said processing modules.

11. The system of claim 10 wherein
- at least one of said optical imaging means comprises at least one of a fiber image guide means and a parallel fiber ribbon means.

12. A packaged opto-electronic device comprising:
- a plurality of optical input ports, each comprising an optical-to-electronic signal converter for conversion of optical signals received at said an optical input port to corresponding electrical signals;
- a plurality of optical output ports, each comprising an electrical-to-optical signal converter for conversion of electrical signals received at said optical output port into corresponding optical signals;
- an electrical input port;
- an electrical output port;
- a controllable first data switch operably connected to said optical input ports and said electrical output port, said first data switch to receive electrical signals from said optical input ports and switch a subset of said received electrical signals to said electrical output port responsive to control signals;
- a controllable second data switch for switching electrical signals from said optical input ports and said electrical input port, to said optical output ports in response to control signals, said second data switch operably connected to said electrical input port, and said optical output ports;
- an integrated circuit substrate comprising a plurality of electrical conductors, wherein said first data switch is interconnected to said plurality of optical channel input ports and said electrical output port by way of electrical conductors on said substrate, and said second data switch is connected to said electrical input port, and said plurality of optical output ports by way of electrical conductors on said substrate; and
- a package suitable for mounting said device onto a substantially larger processing module, said package packaging said plurality of optical input ports, said plurality of optical output ports, said electrical input port, said electrical output port, said first data switch, said second data switch and said substrate.

13. The opto-electronic device of claim 12, further comprising:
- a control input port for receiving control signals to control at least one of said first data switch and said second data switch.

14. The opto-electronic device of claim 13, further comprising
- a control output port, for outputting control signals to said substantially larger processing module.

15. The opto-electronic device of claim 13, further comprising:
- a control signal storage circuit operably connected to at least one of said first data switch and said second data switch, for storing controlling signals controlling at least one of said first data switch and said second data switch.

16. The opto-electronic device of claim 15, further comprising:
- a control processing circuit in communication with said control input port and operably connected to said control signal storage circuit, said control processing circuit operable to generate control signals to be stored in said control signal storage circuit, responsive to control signals at said control input port.

17. The opto-electronic device of claim 16, wherein
- said control processing circuit is in communication with at least one of said optical input ports, to process signals from said optical input ports and determine control signals to be stored in said control signal storage circuit, thereby controlling at least one of said first and second data switch.

18. A computing system comprising:
- a first and second opto-electronic device each as claimed in claim 17; and
- an optical imaging means, imaging optical signals from each one optical output port of said first opto-electronic device to a corresponding optical input port of said second opto-electronic device.

19. A computing system comprising:
- a plurality of opto-electronic devices, each as claimed in claim 15, interconnected in an optical ring;
- a plurality of optical imaging means interconnecting at least one optical output port of each one of said opto-electronic devices to at least one corresponding optical input port of another one of said plurality of opto-electronic devices to form said optical ring.

20. The computing system as claimed in claim 19, wherein one optical input port of each of said plurality of opto-electronic devices is operably connected to receive an optical clock signal from another opto-electronic device, and one optical output port is operably connected to transmit an optical clock signal to another opto-electronic device.

21. The computing system as claimed in claim 19, wherein at least one of said plurality of optical imaging means comprises one of a two dimensional fiber ribbon, and an optical image guide.

22. The opto-electronic device of claim 12, further comprising:
a plurality of first input data storage circuits, each one of which is operably connected to an associated one of said optical-to-electrical signal converters, for buffering electrical signals from said associated one of said optical-to-electrical signal converters.

23. The opto-electronic device of claim 22, further comprising
a data processing circuit operably connected to said second data switch and at least one of said optical input ports, by way of at least one of said first input data storage circuits, said data processing circuit operable to receive data from an interconnected optical input port and modify said received data, so that said second switch switches data modified by said data processor to at least one of said optical output ports.

24. The opto-electronic device of claim 12, further comprising:
a plurality of second input data storage circuits, each one of which is operably connected to an associated one of said electrical input ports, for buffering incoming electrical signals at said associated one of said electrical input ports.

25. The opto-electronic device of claim 12, further comprising
a data processing circuit operably connected to said second data switch and at least one of said optical input ports, operable to receive data from an interconnected optical input port and modify said received data, so that said second switch switches data modified by said data processor to at least one of said optical output ports.

26. The opto-electronic device of claim 25, wherein said data processing circuit modifies at least some of said received data using parallel prefix computations.

27. The opto-electronic device of claim 12, wherein
said optical input ports and said optical output ports are each clocked at an optical clock rate;
said electrical input port and said electrical output port are clocked at first and second electrical clock rates, respectively;
and wherein said optical clock rate exceeds both said first and second electrical clock rates.

28. The opto-electronic device of claim 12, wherein
said integrated circuit substrate comprises silicon; and
wherein each of said optical-to-electrical signal converters comprises at least one of a Self-Electro Optical Device (SEED) and a Vertical Cavity Surface Emitting Laser (VCSEL).

29. A computing system comprising an opto-electronic device as claimed in claim 12.

30. A computing system comprising:
a first and second opto-electronic device as claimed in claim 12; and
an optical imaging means, imaging optical signals from each one optical output port of said first opto-electronic device to a corresponding optical input port of said second opto-electronic device.

31. A packaged opto-electronic device comprising:
a plurality of optical input ports, each comprising an optical-to-electronic signal converter for conversion of optical signals received at said an optical input port to corresponding electrical signals;
a plurality of optical output ports, each comprising an electrical-to-optical signal converter for conversion of electrical signals received at said optical output port into corresponding optical signals;
at least one electrical input port;
at least one electrical output port;
a controllable first data switch operably connected to at least one of said plurality optical input ports and said at least one electrical output port, said first data switch to receive electrical signals from said plurality of optical input ports and switch a subset of said received electrical signals to said at least one electrical output port responsive to control signals;
a controllable second data switch for switching electrical signals from said plurality of optical input ports and said at least one electrical input port, to said optical output ports in response to control signals, said second data switch operably connected to said at least one electrical input port, and at least one of said optical output ports;
a control input port for receiving control signals to control at least one of said first data switch and said second data switch;
a control signal storage circuit operably connected to at least one of said first and second data switch, for storing control signals controlling at least one of said first and second data switch;
a control processing circuit in communication with said control input port and operably connected to said control signal storage circuit, said control processing circuit operable to generate control signals to be stored in said control signal storage circuit, responsive to control signals at said control input port,
wherein said control processing circuit is in communication with at least one of said optical input ports, to process signals from said at least one of optical input ports and determine control signals to be stored in said control signal storage circuit, thereby controlling at least one of said first and second data switch;
an integrated circuit substrate comprising a plurality of electrical conductors, wherein said first data switch is interconnected to said plurality of optical channel input ports and said at least one electrical output port by way of electrical conductors on said substrate, and said second data switch is connected to said at least one electrical input port, and said plurality of optical output ports by way electrical conductors on said subtrate; and
a package suitable for mounting said device onto a substantially larger processing module, said package packaging said plurality of optical input ports, said plurality of optical output ports, said at least one electrical input port, said at least one electrical output port, said first data switch, said second data switch, said control input port, said control signal storage circuit, said control processing circuit and said substrate.

32. The opto-electronic device of claim 31, wherein
said optical input ports and said optical output ports are clocked at an optical clock rate;

said at least one electrical input port and said at least one electrical output port are clocked at first and second electrical clock rates, respectively;

and wherein said optical clock rate exceeds both said first and second electrical clock rates.

33. A packaged opto-electronic device comprising:

an optical input port, comprising an optical-to-electronic signal converter for conversion of optical signals received at said optical input port to corresponding electrical signals;

an optical output port, comprising an electrical-to-optical signal converter for conversion of electrical signals received at said optical output port into corresponding optical signals;

an electrical input port;

an electrical output port;

a controllable first data switch operably connected to said optical input port and said electrical output port, said first data switch to receive electrical signals from said optical input port and switch a subset of said received electrical signals to said electrical output port responsive to control signals;

a controllable second data switch for switching electrical signals from said optical input port and said electrical input port, to said optical output port in response to control signals, said second data switch operably connected to said electrical input port, and said optical output port;

a control input port for receiving control signals to control at least one of said first data switch and said second data switch;

a control signal storage circuit operably connected to at least one of said first and second data switch, for storing control signals controlling at least one of said first and second data switch;

a control processing circuit in communication with said control input port and said optical input port, and operably connected to said control signal storage circuit, said control processing circuit operable to generate control signals to be stored in said control signal storage circuit, responsive to control signals at said control input port and signals at said optical input port, thereby controlling at least one of said first and second data switch;

a data processing circuit operably connected to said second data switch and said optical input port, operable to receive data from said optical input port and modify said received data, so that said second data switch switches data modified by said data processor to said optical output port;

an integrated circuit substrate comprising a plurality of electrical conductors, wherein said first data switch is interconnected to said optical channel input ports and said electrical output port by way of electrical conductors on said substrate, and said second data switch is connected to said electrical input port, and said optical output port by way electrical conductors on said substrate; and a package suitable for mounting said device onto a substantially larger processing module, said package packaging said optical input port, said optical output port, said electrical input port, said electrical output port, said first data switch, said second data switch, said control input port, said control signal storage circuit, said control processing circuit, said data processing circuit and said substrate.

34. The opto-electronic device of claim 33, wherein said data processing circuit modifies at least some of said received data using parallel prefix computations.

35. The opto-electronic device of claim 33, wherein said optical input port and said optical output port are clocked at an optical clock rate;

said electrical input port and said electrical output port are clocked at first and second electrical clock rates, respectively;

and wherein said optical clock rate exceeds both said first and second electrical clock rates.

* * * * *